(12) United States Patent
Jang et al.

(10) Patent No.: US 12,298,657 B2
(45) Date of Patent: May 13, 2025

(54) CAMERA ACTUATOR AND CAMERA DEVICE INCLUDING SAME

(71) Applicant: LG INNOTEK CO., LTD., Seoul (KR)

(72) Inventors: Young Bae Jang, Seoul (KR); Jae Wook Kwon, Seoul (KR); Dae Sik Jang, Seoul (KR); Soo Min Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 315 days.

(21) Appl. No.: 17/767,812

(22) PCT Filed: Oct. 8, 2020

(86) PCT No.: PCT/KR2020/013731
§ 371 (c)(1),
(2) Date: Apr. 8, 2022

(87) PCT Pub. No.: WO2021/071280
PCT Pub. Date: Apr. 15, 2021

(65) Prior Publication Data
US 2022/0413356 A1    Dec. 29, 2022

(30) Foreign Application Priority Data

Oct. 8, 2019  (KR) .......................... 10-2019-0124800
Mar. 18, 2020 (KR) .......................... 10-2020-0033329

(51) Int. Cl.
*G02B 15/14*   (2006.01)
*G02B 15/22*   (2006.01)
(Continued)

(52) U.S. Cl.
CPC ............ *G03B 5/02* (2013.01); *G02B 15/1421* (2019.08); *G02B 15/22* (2013.01); *G03B 5/04* (2013.01);
(Continued)

(58) Field of Classification Search
CPC .... G03B 5/02; G03B 5/04; G03B 2205/0046; G03B 2205/0069; G03B 2205/0023;
(Continued)

(56) References Cited

U.S. PATENT DOCUMENTS 10,444,600 B2   10/2019   Park et al.
10,816,756 B2   10/2020   Lee et al.
(Continued)

FOREIGN PATENT DOCUMENTS

CN    1949073 A      4/2007
CN    106054346 A   10/2016
(Continued)

*Primary Examiner* — Wyatt A Stoffa
*Assistant Examiner* — John Curtis Sipes
(74) *Attorney, Agent, or Firm* — Birch, Stewart, Kolasch & Birch, LLP

(57) ABSTRACT

A camera device according to one embodiment of the present invention comprises: a base; a first lens assembly which is disposed in the base and includes a first lens group and a first lens support unit to which the first lens group is fixed; a second lens assembly which is disposed in the base and includes a second lens group and a second lens support unit to which the second lens group is fixed; and a driving unit for moving the second lens assembly, wherein a first stopper member and a second stopper member are formed on the inner wall of the second lens support unit and spaced apart from each other by a distance that is greater than the height of the first lens assembly along the movement direction of the second lens support unit, the first lens assembly is accommodated between the first stopper member and the second stopper member in the second lens support unit, and the second lens assembly moves alongside the first lens assembly within the base.

20 Claims, 30 Drawing Sheets

(51) Int. Cl.
  *G03B 5/02*   (2021.01)
  *G03B 5/04*   (2021.01)
(52) U.S. Cl.
  CPC ............. *G03B 2205/0046* (2013.01); *G03B 2205/0069* (2013.01)
(58) Field of Classification Search
  CPC . G03B 3/10; G03B 5/00; G03B 30/00; G03B 17/17; G03B 13/36; G03B 17/12; G03B 5/225; G02B 15/1421; G02B 15/22; H04N 23/54; H04N 23/55; H04N 23/685
  See application file for complete search history.

(56) References Cited

U.S. PATENT DOCUMENTS

| | | | | |
|---|---|---|---|---|
| 2007/0133967 | A1* | 6/2007 | Takahashi | G02B 27/646 |
| | | | | 396/55 |
| 2007/0183764 | A1* | 8/2007 | Imura | H04N 23/55 |
| | | | | 348/E5.046 |
| 2009/0231537 | A1* | 9/2009 | Yamamiya | G03B 17/00 |
| | | | | 349/200 |
| 2016/0103297 | A1* | 4/2016 | Kobayashi | G02B 7/08 |
| | | | | 359/824 |
| 2016/0142605 | A1* | 5/2016 | Shimizu | H04N 23/51 |
| | | | | 348/373 |
| 2017/0295321 | A1* | 10/2017 | Fukai | G02B 27/646 |
| 2017/0353634 | A1* | 12/2017 | Kim | H04N 23/54 |
| 2018/0246345 | A1 | 8/2018 | Park et al. | |
| 2018/0364450 | A1 | 12/2018 | Lee et al. | |
| 2018/0367714 | A1 | 12/2018 | Im et al. | |
| 2018/0372987 | A1* | 12/2018 | Tseng | G03B 13/36 |
| 2019/0265438 | A1* | 8/2019 | Sekine | G02B 7/021 |
| 2019/0324226 | A1* | 10/2019 | Mori | G02B 9/34 |
| 2019/0377166 | A1* | 12/2019 | Komatsu | G03B 3/10 |
| 2020/0096745 | A1* | 3/2020 | Chang | G03B 5/04 |
| 2020/0174270 | A1* | 6/2020 | Enta | G02B 7/09 |

FOREIGN PATENT DOCUMENTS

| | | |
|---|---|---|
| CN | 107076960 A | 8/2017 |
| CN | 107995388 A | 5/2018 |
| CN | 110099198 A | 8/2019 |
| JP | 2009-162896 A | 7/2009 |
| JP | 2013-11749 A | 1/2013 |
| JP | 2013-178380 A | 9/2013 |
| JP | 2017-37254 A | 2/2017 |
| JP | 2017-189303 A | 10/2017 |
| KR | 10-1877039 B1 | 7/2018 |
| KR | 10-2018-0137278 A | 12/2018 |
| KR | 10-2019-0057028 A | 5/2019 |
| KR | 10-2019-0092719 A | 8/2019 |
| KR | 10-2019-0103862 A | 9/2019 |
| WO | WO 2019/151772 A1 | 8/2019 |
| WO | WO 2019/164296 A1 | 8/2019 |

\* cited by examiner

[Fig. 1]
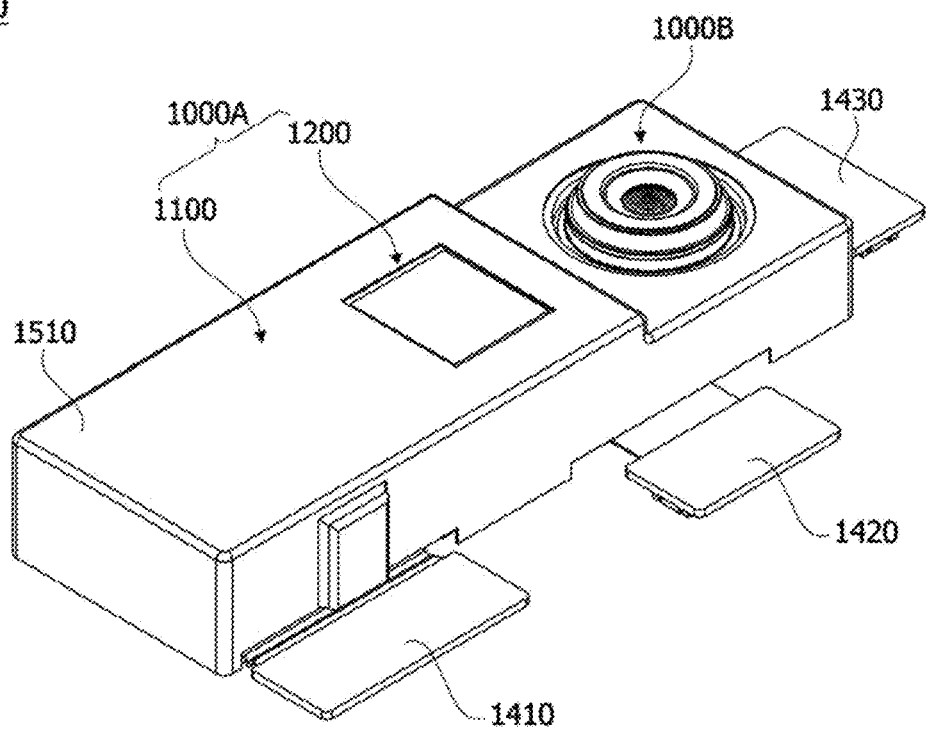
[Fig. 2a]
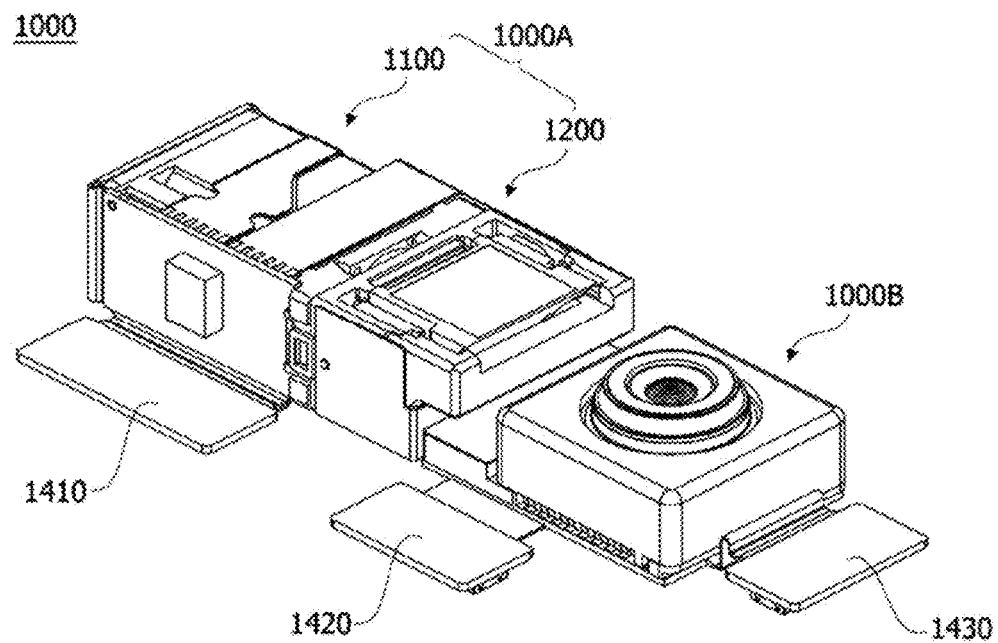

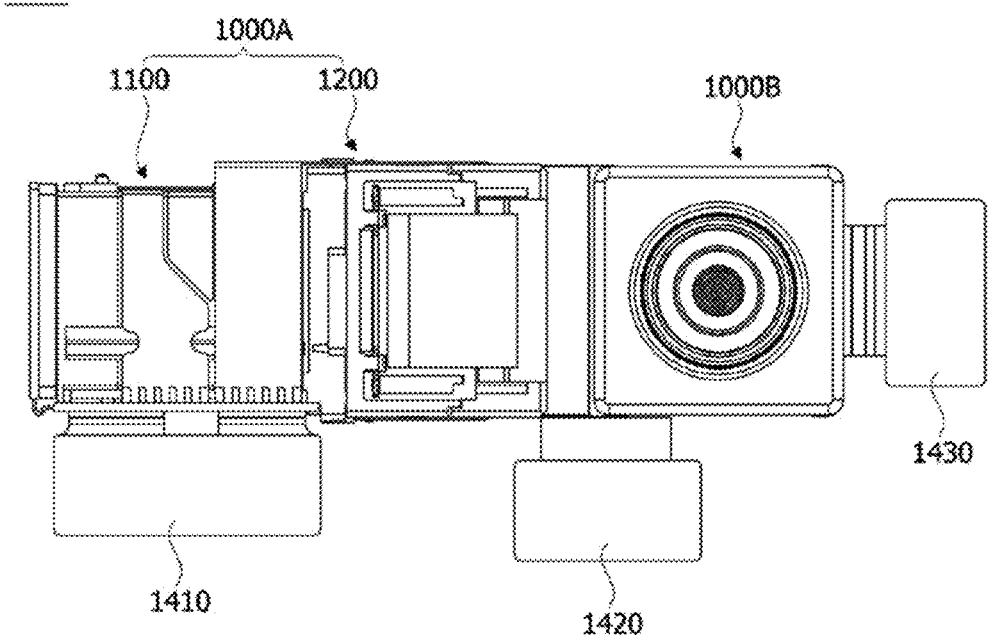
[Fig. 2b]

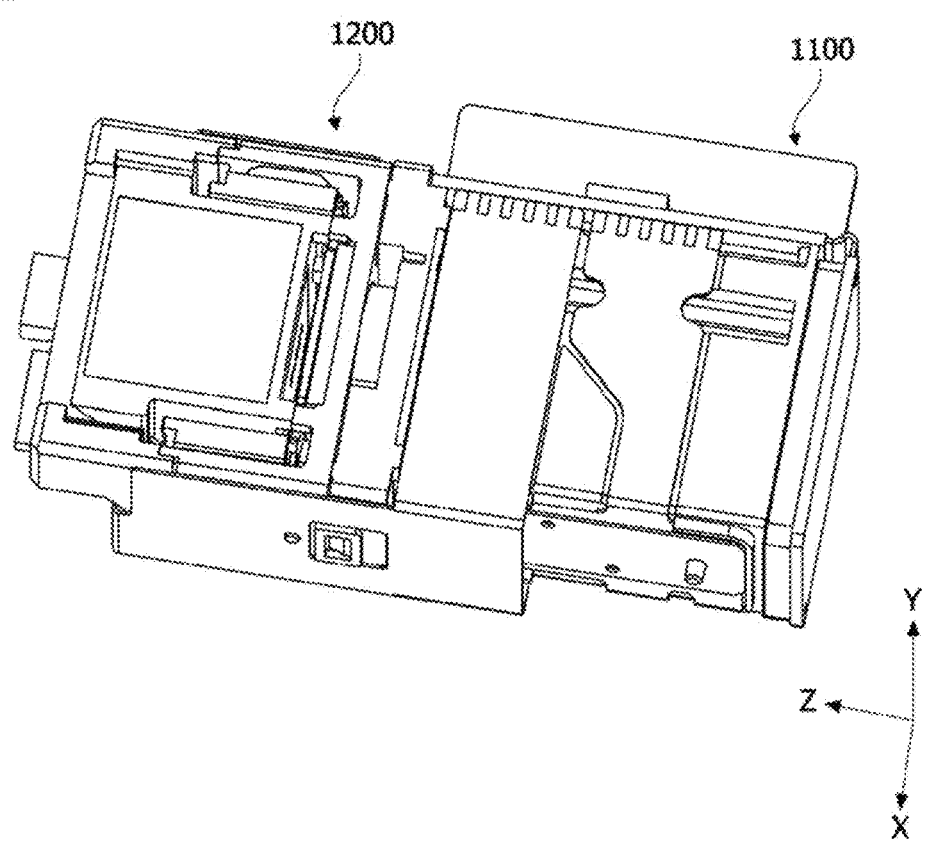
[Fig. 3a]
1000A

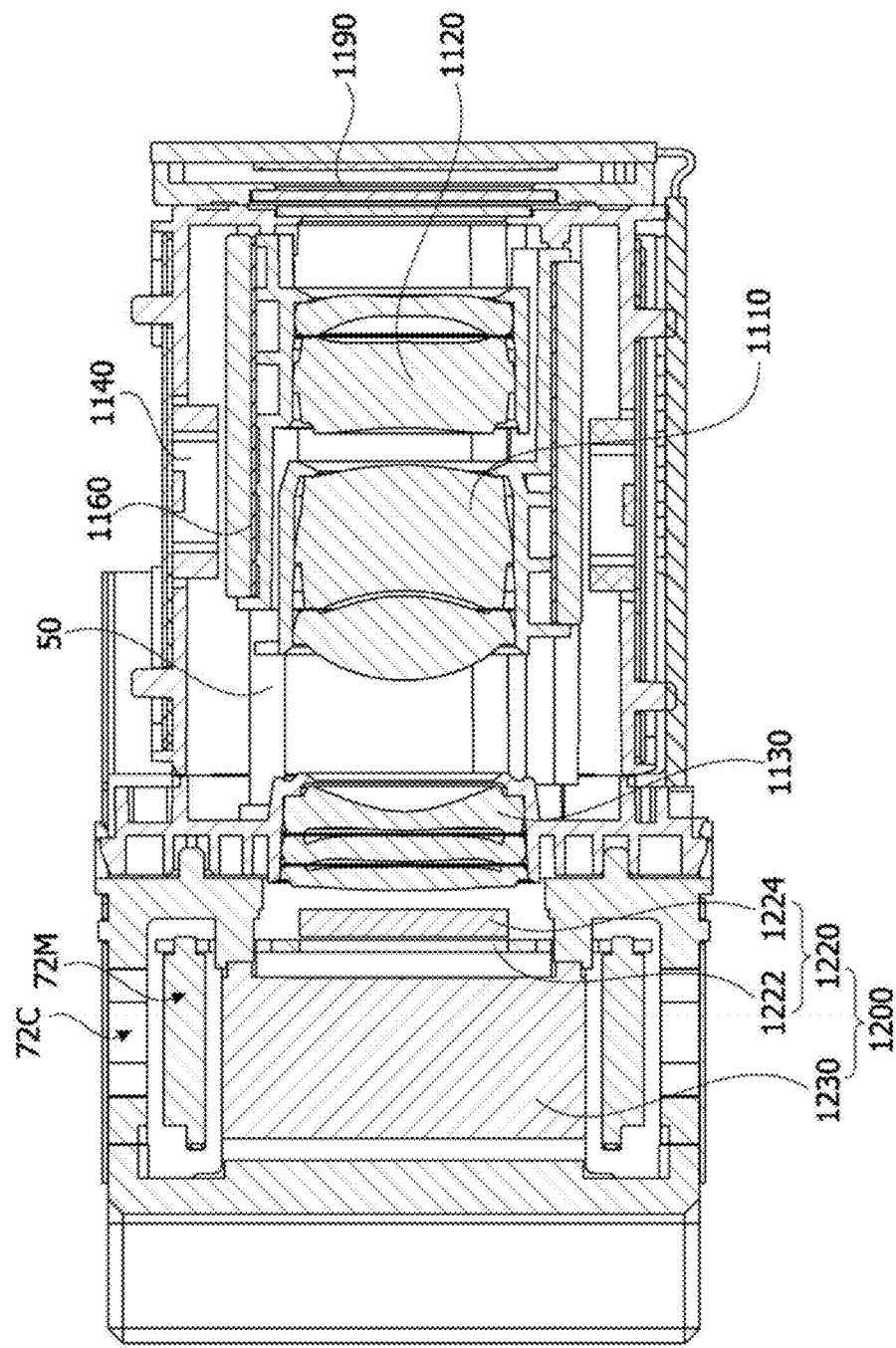

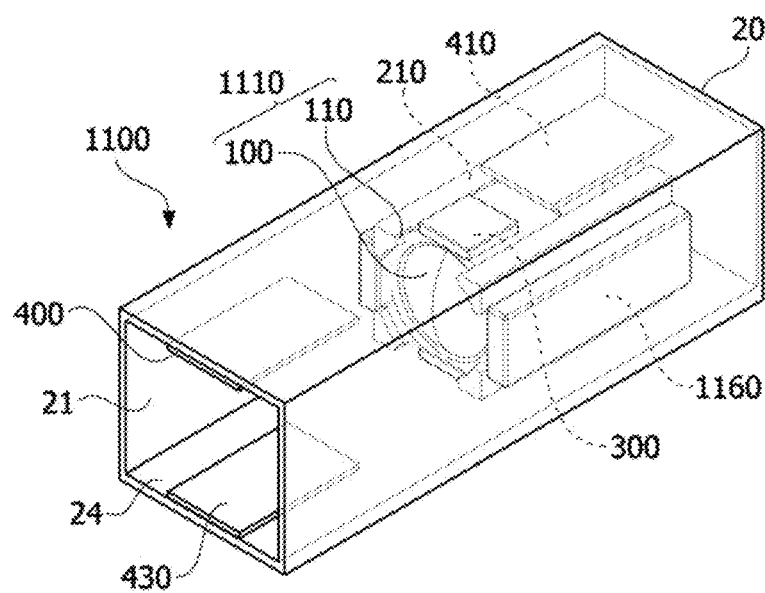
[Fig. 4]

[Fig. 5]
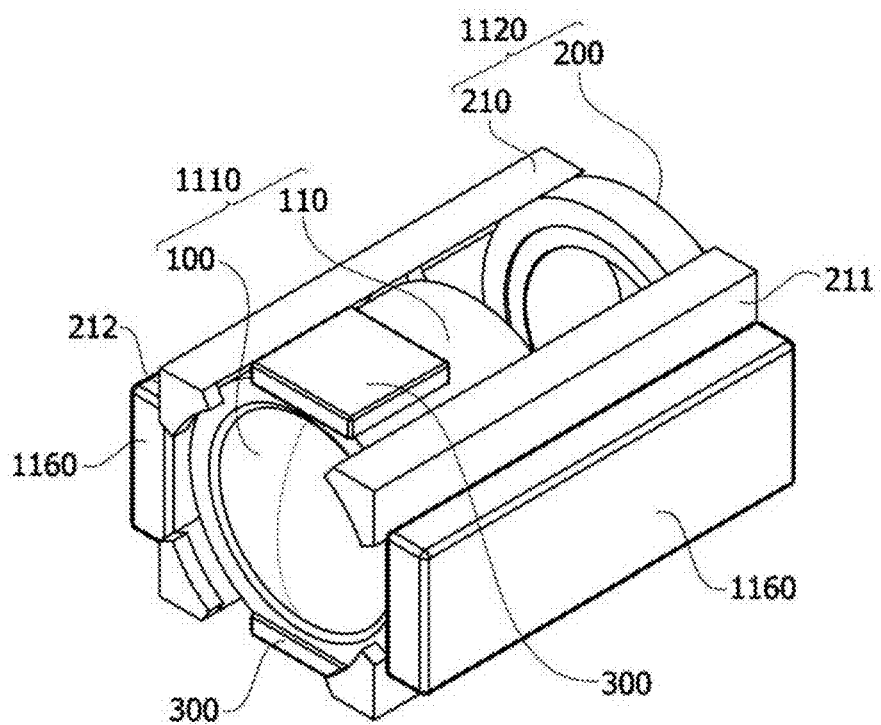

[Fig. 6]
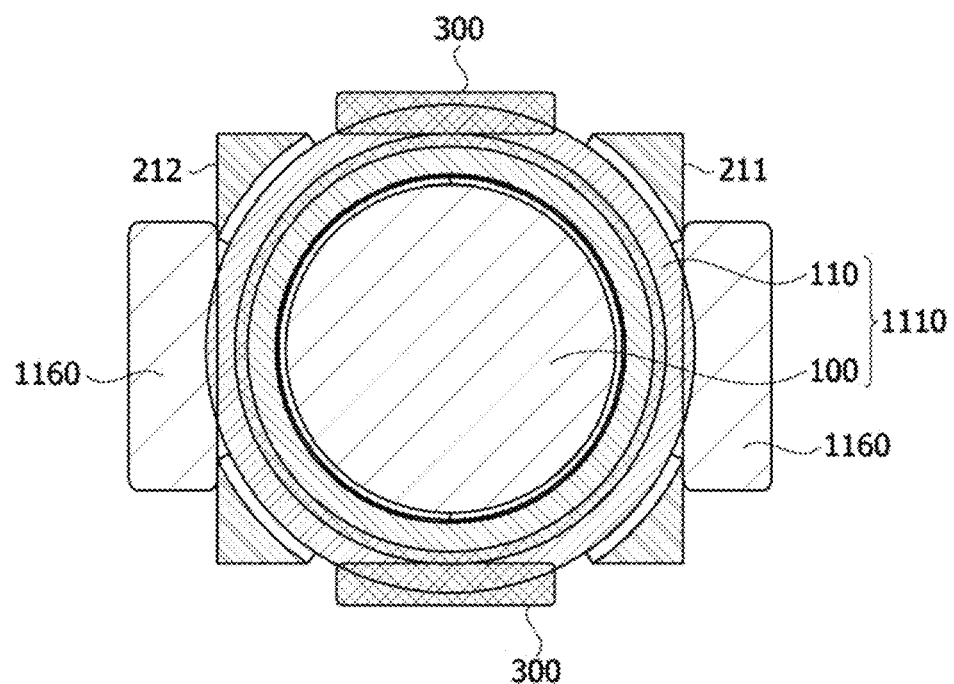
[Fig. 7]
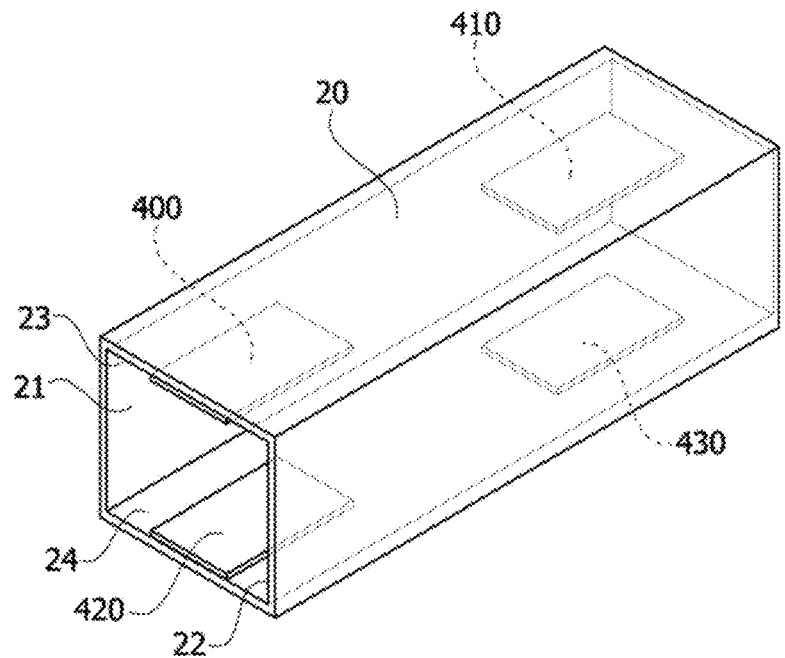

[Fig. 8]
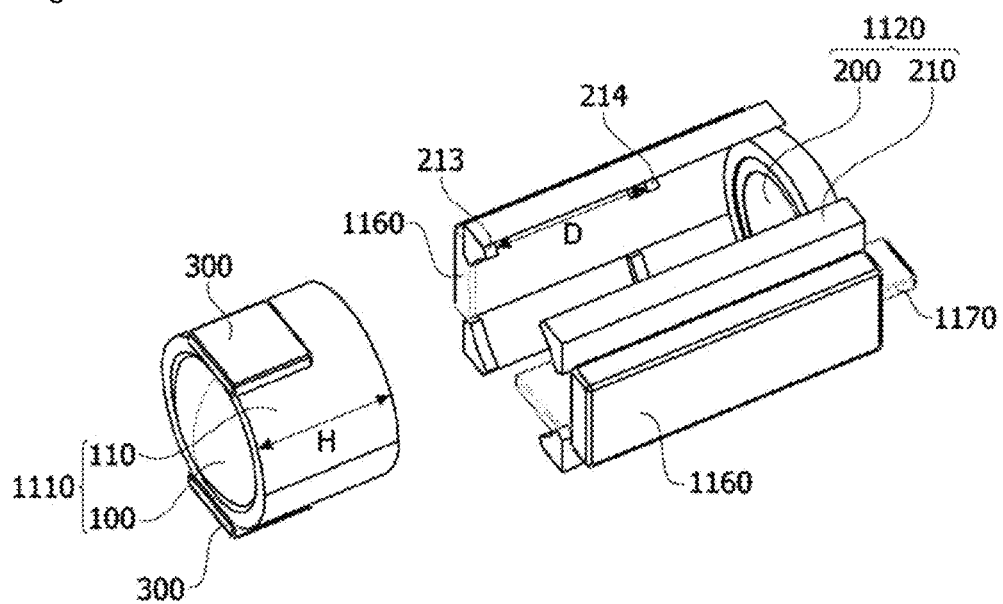

[Fig. 9]
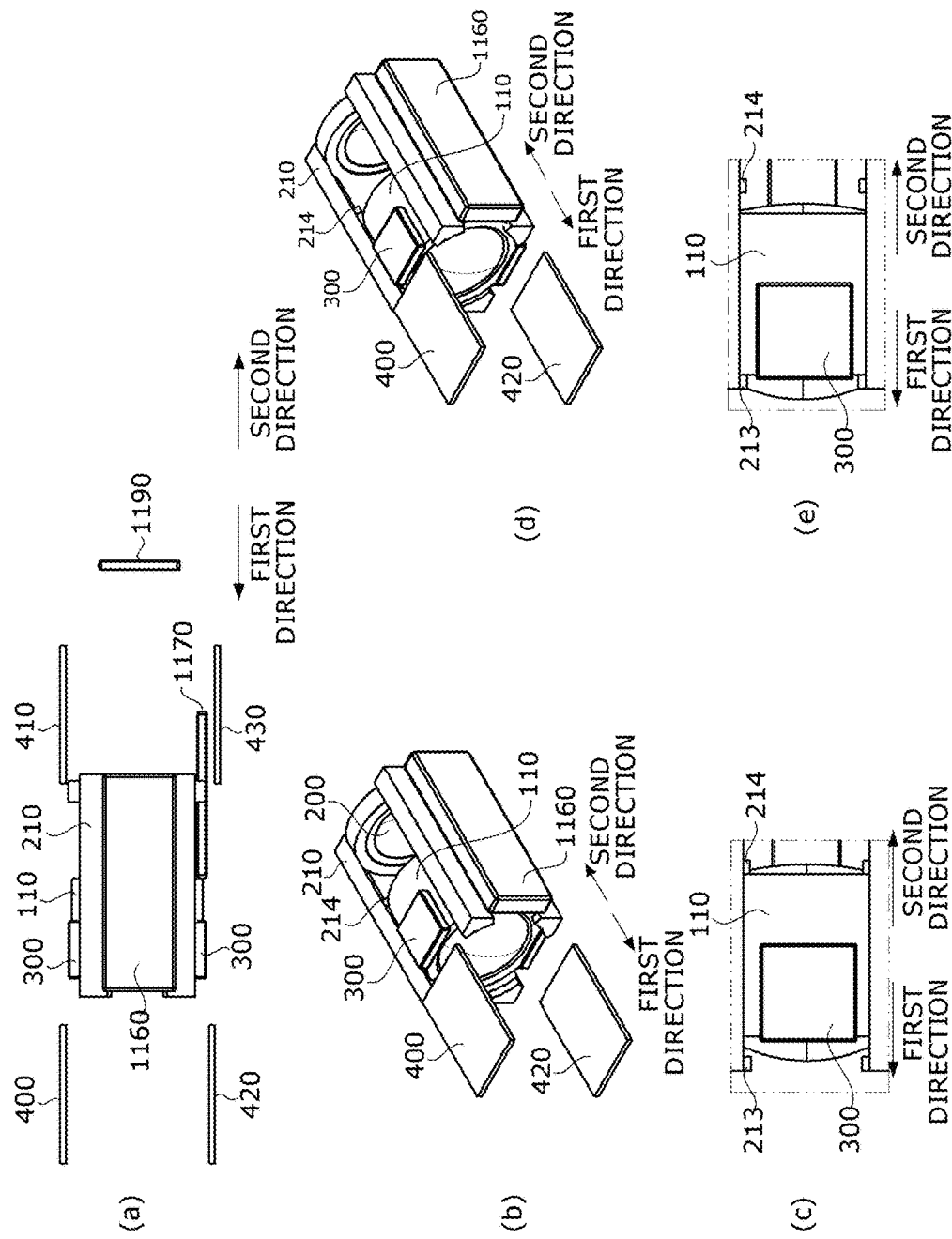

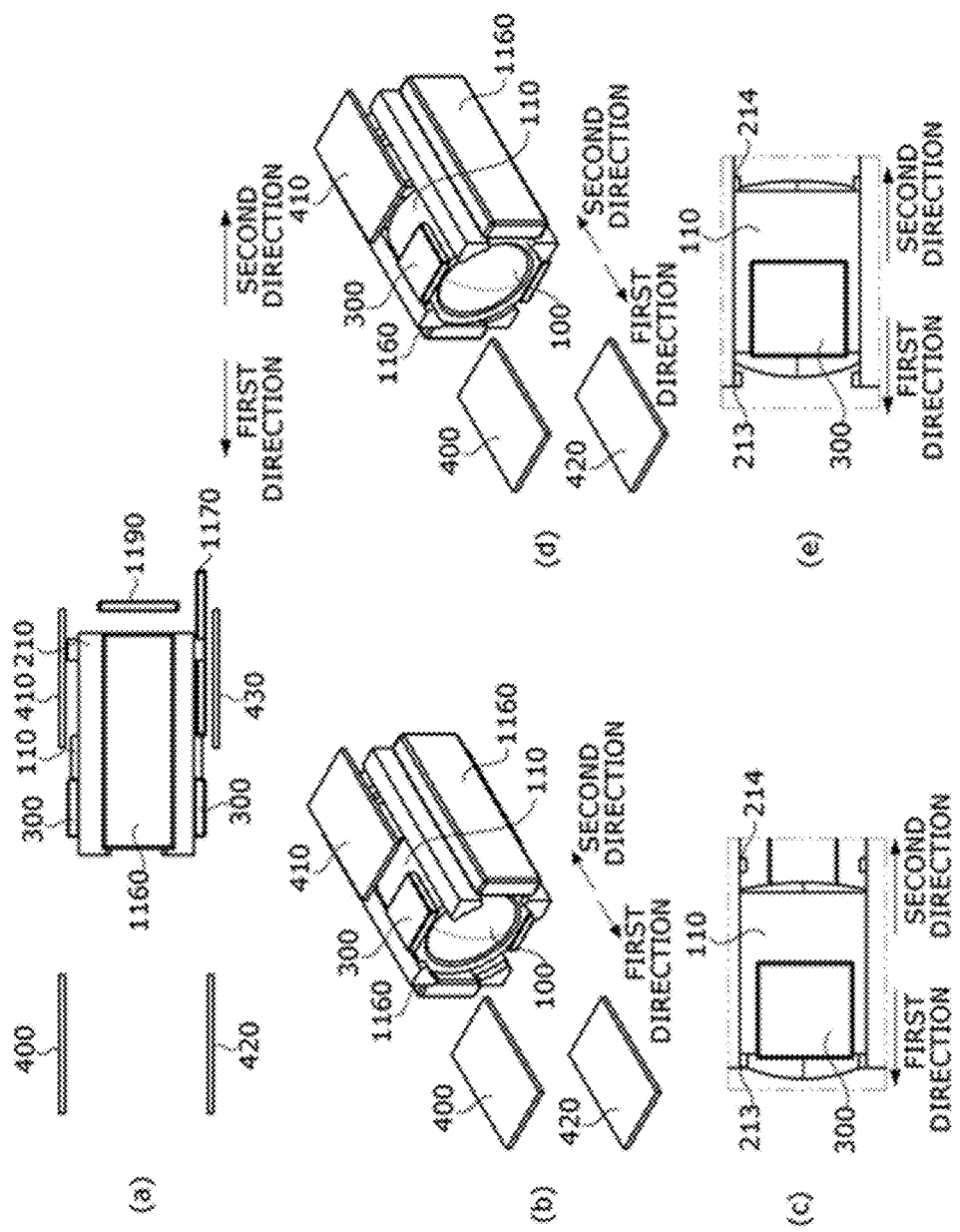
[Fig. 10]

[Fig. 11a]
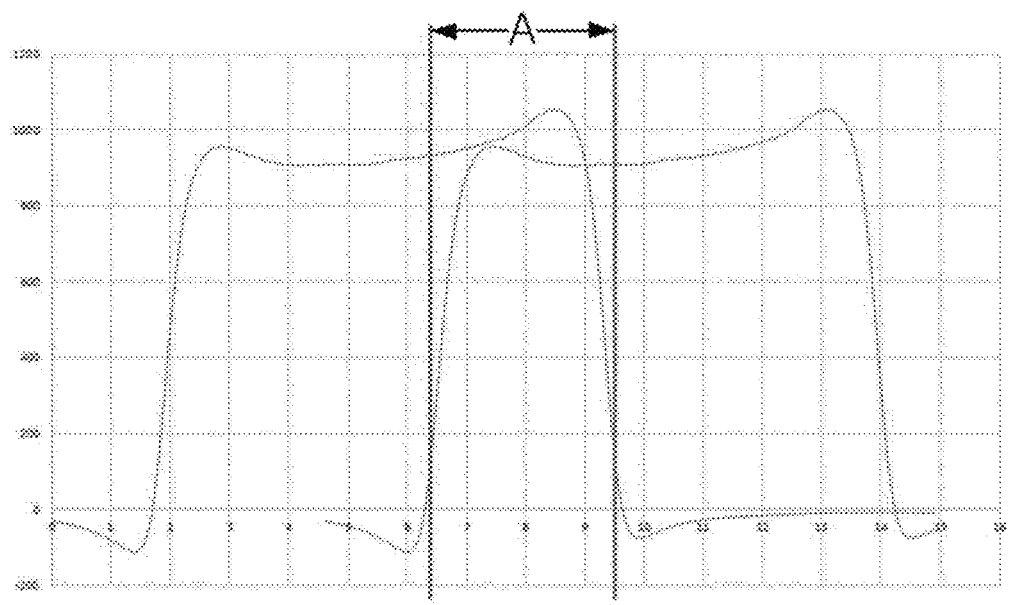
[Fig. 11b]
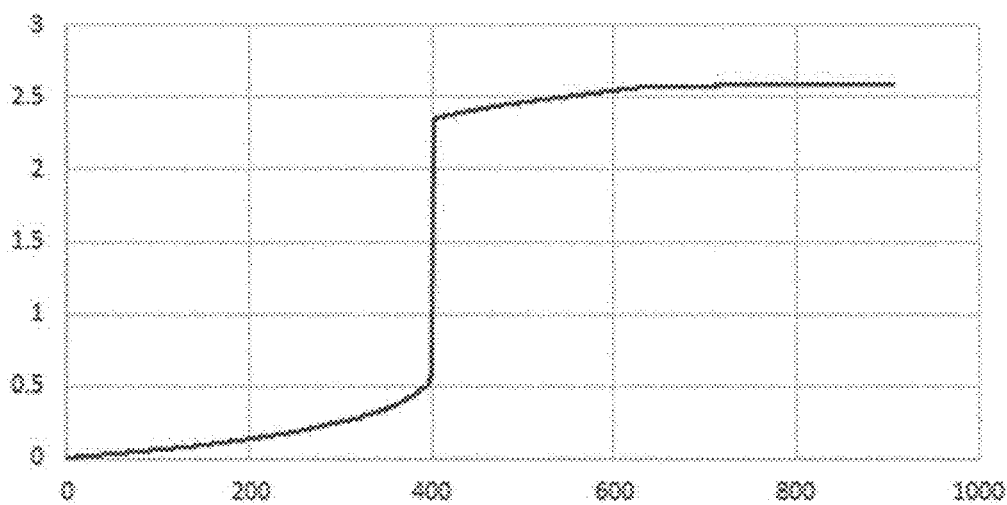

[Fig. 11c]
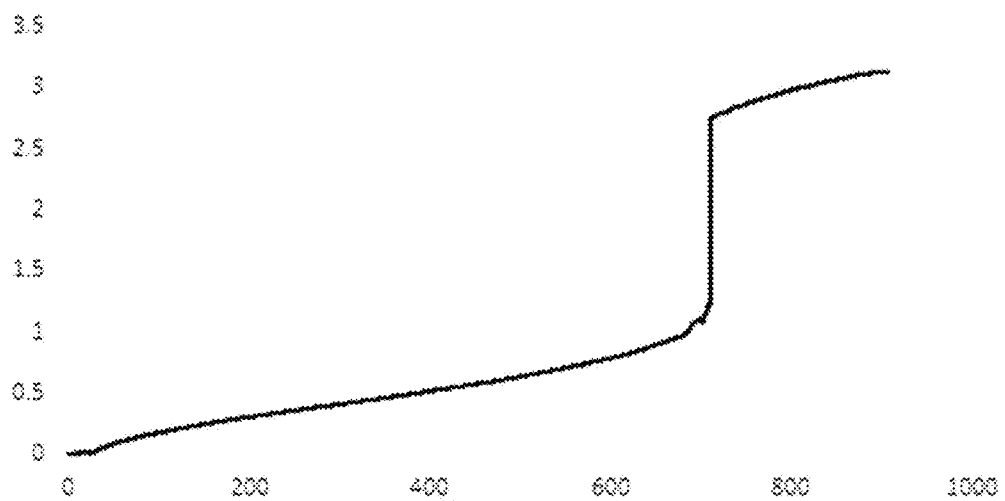
[Fig. 12]
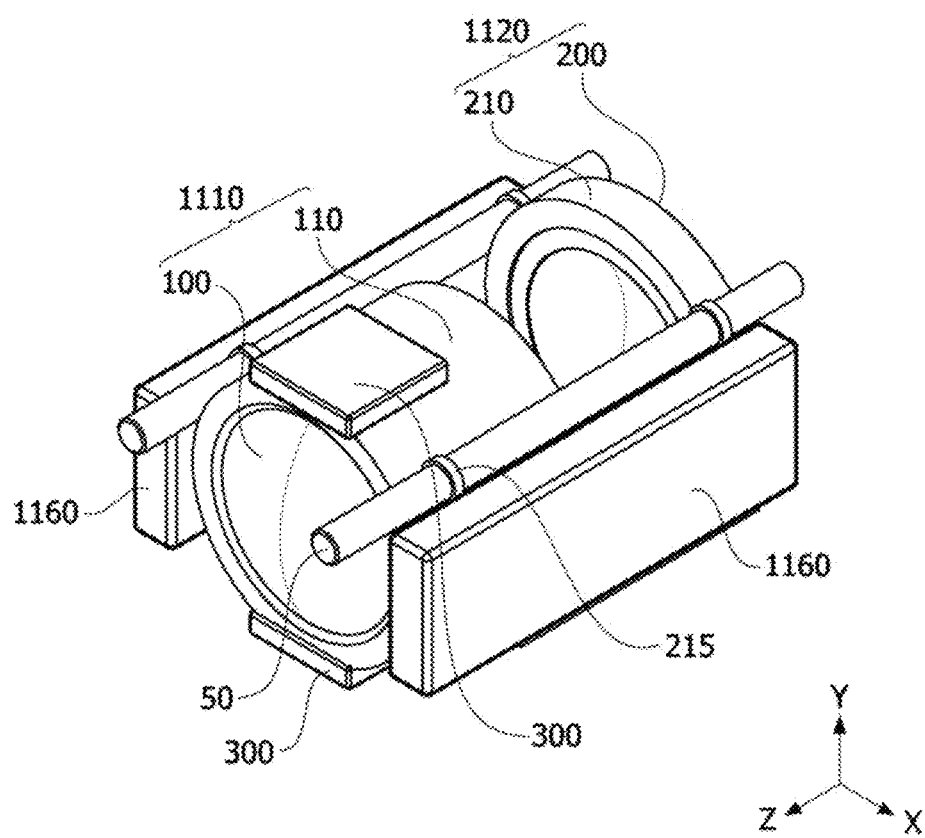

[Fig. 13]
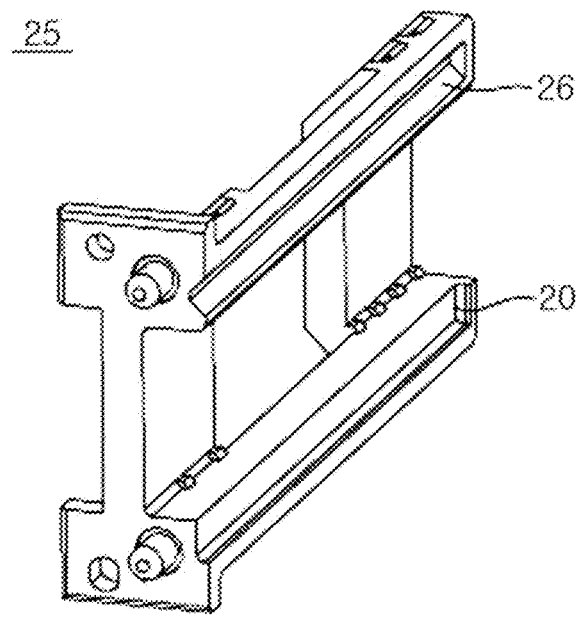
[Fig. 14]
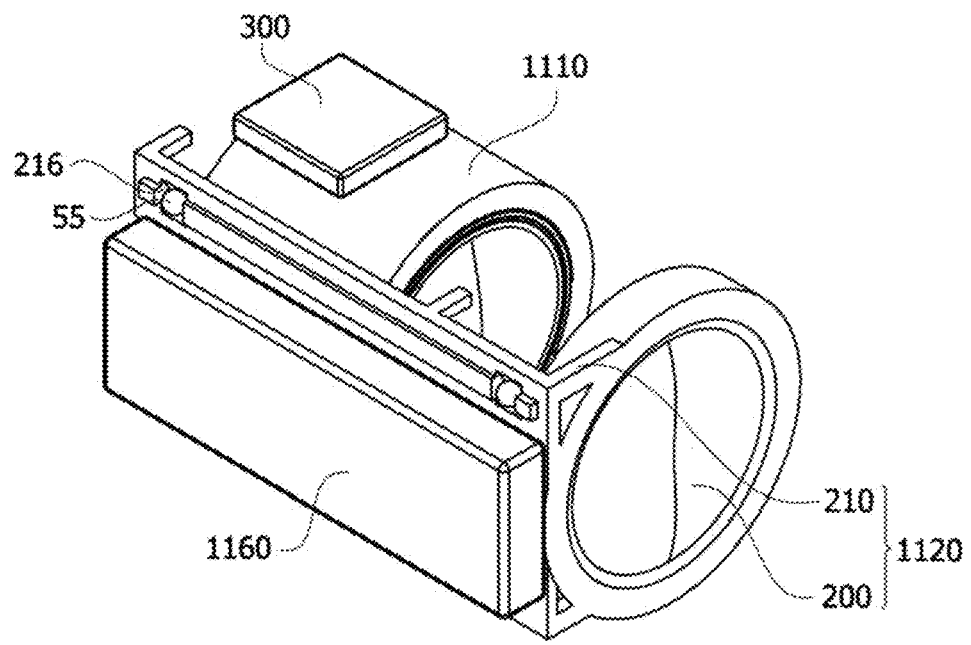

[Fig. 15]
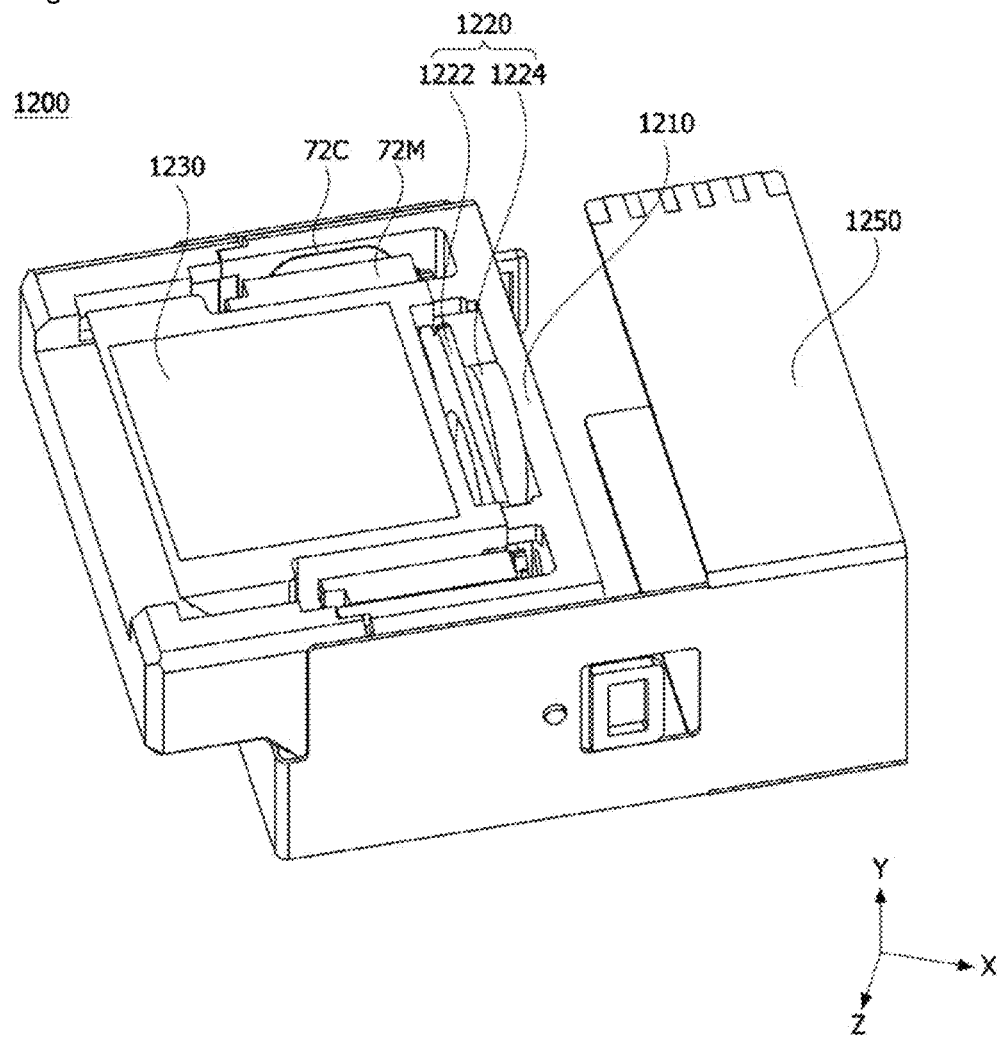

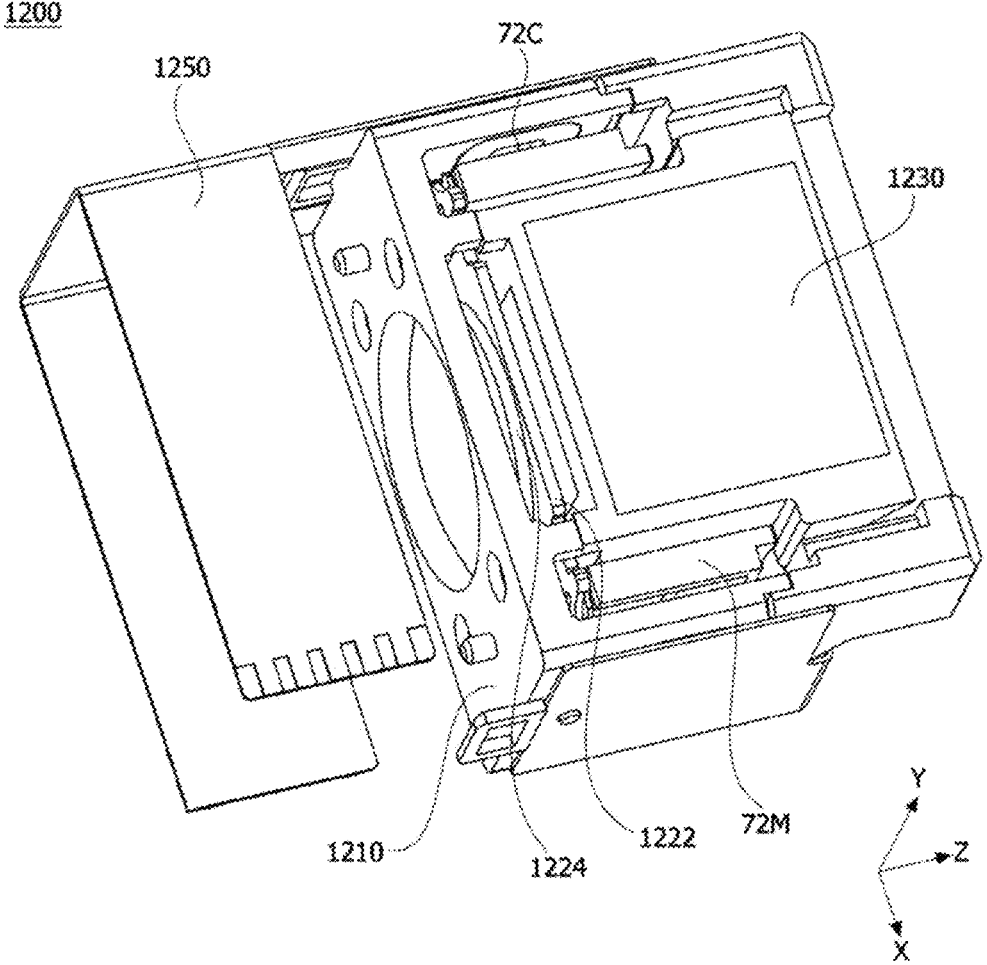

[Fig. 17]
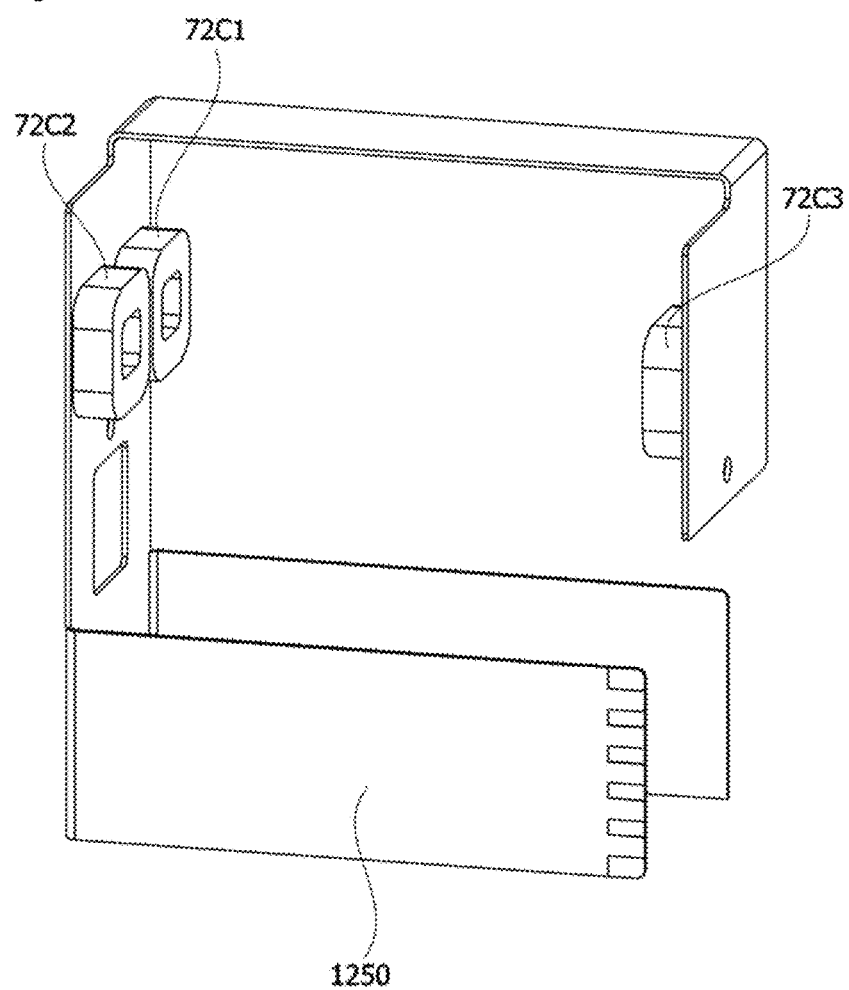

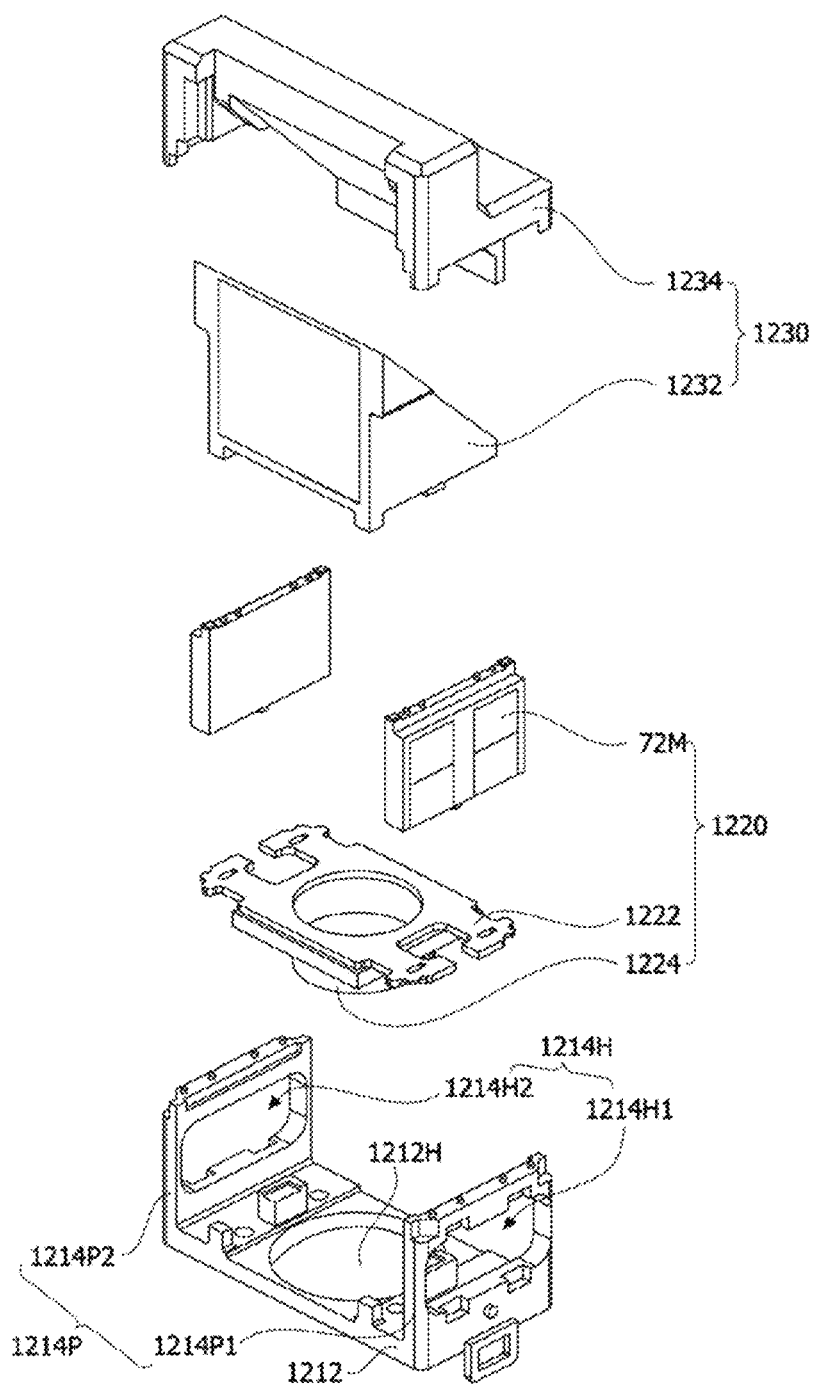
[Fig. 18]

[Fig. 19]
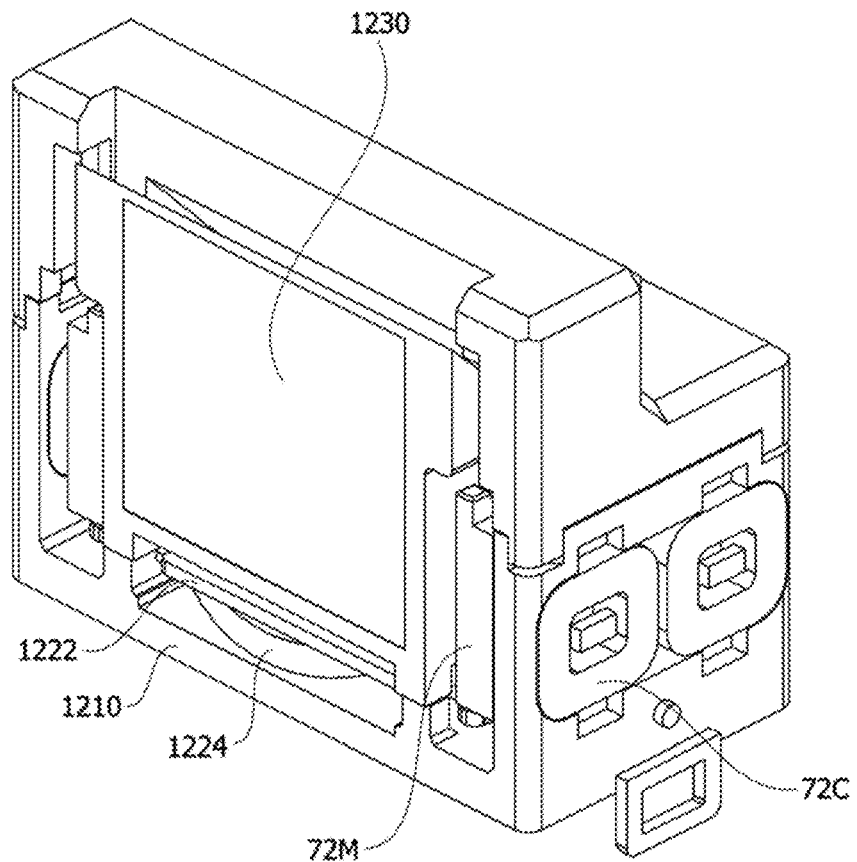
[Fig. 20]
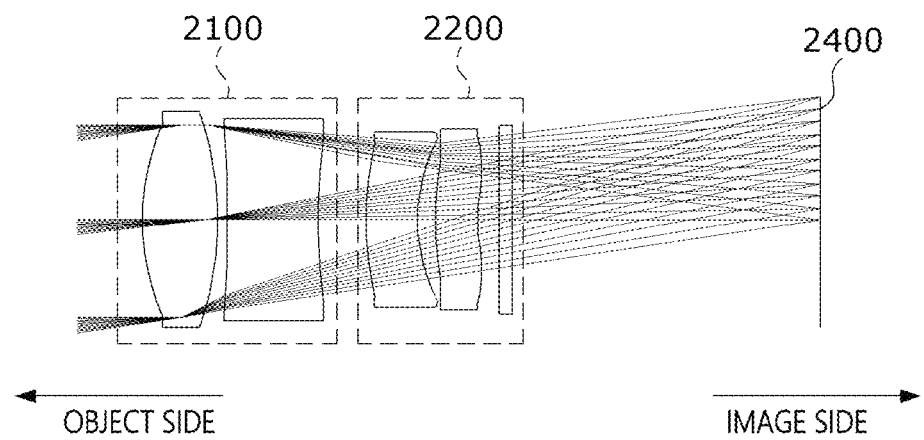

[Fig. 21]
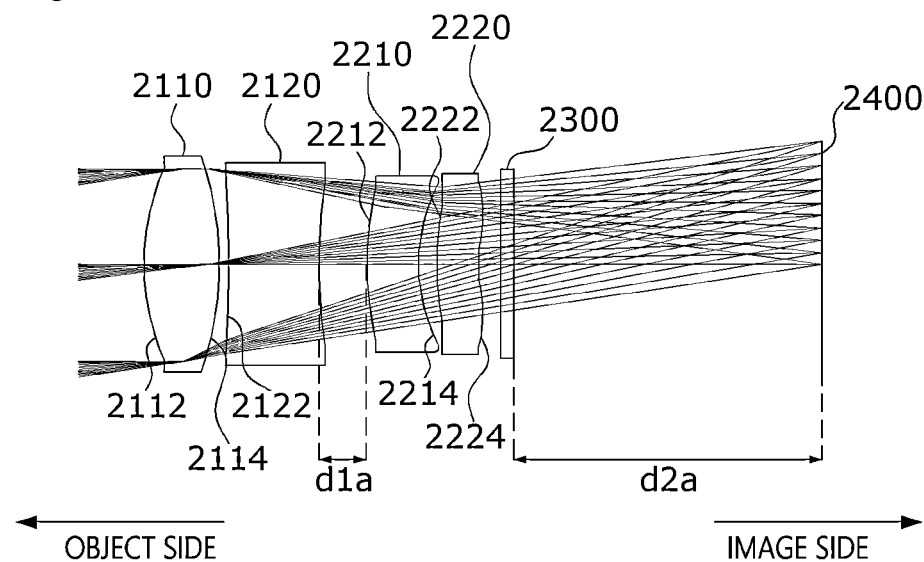
[Fig. 22]
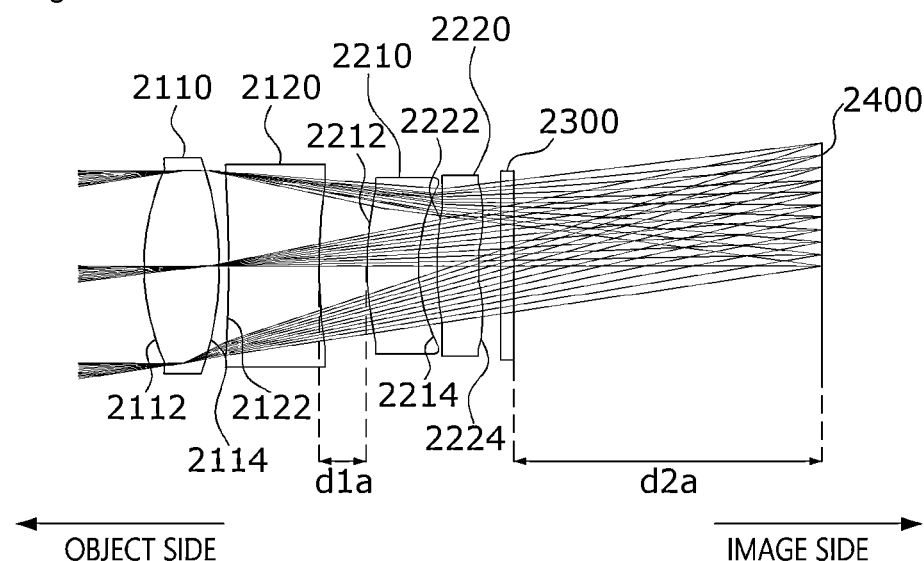

[Fig. 23]
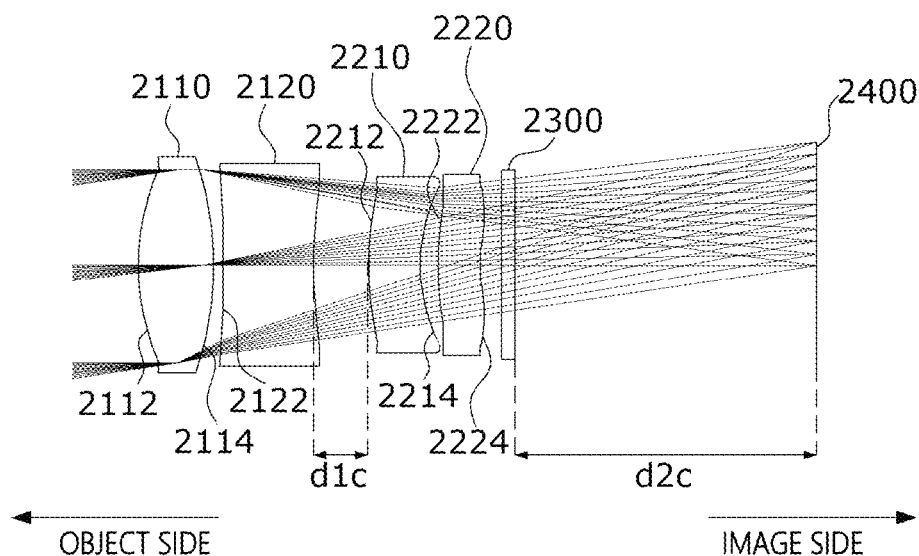
[Fig. 24]
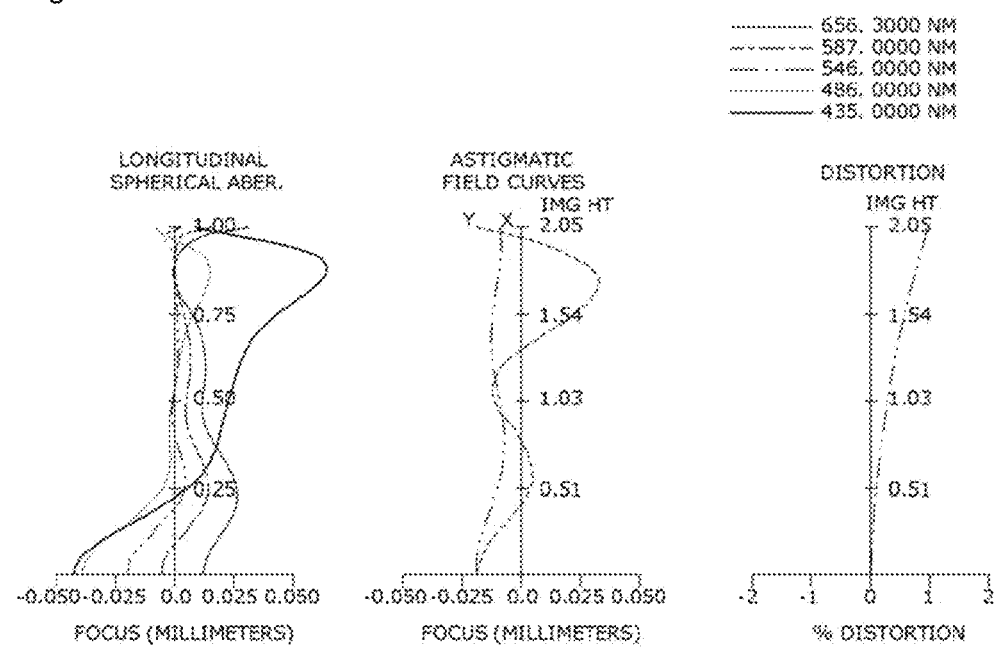

[Fig. 25]
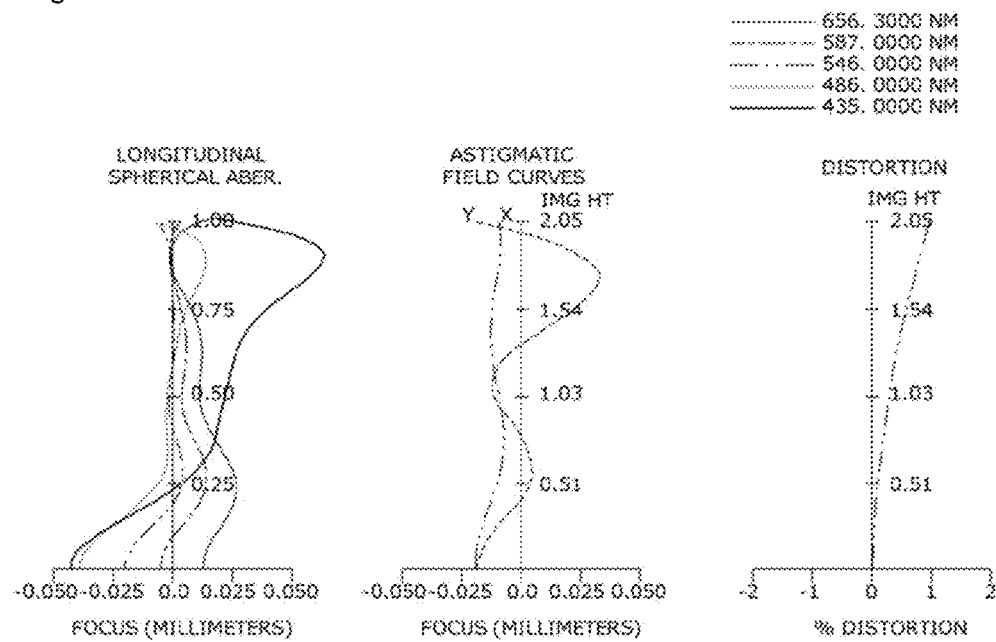
[Fig. 26]
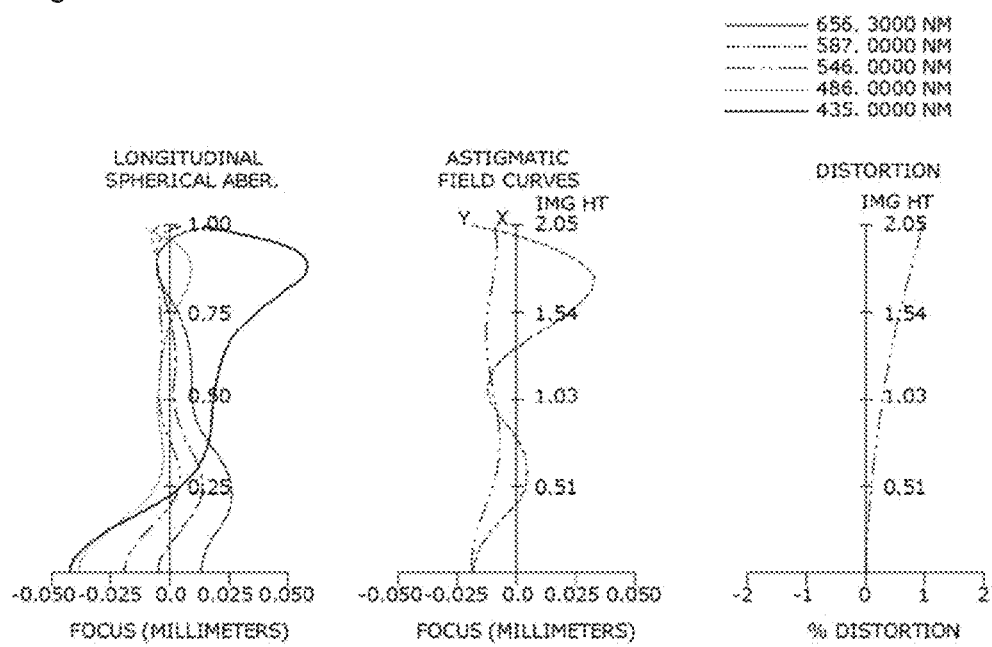

[Fig. 27]
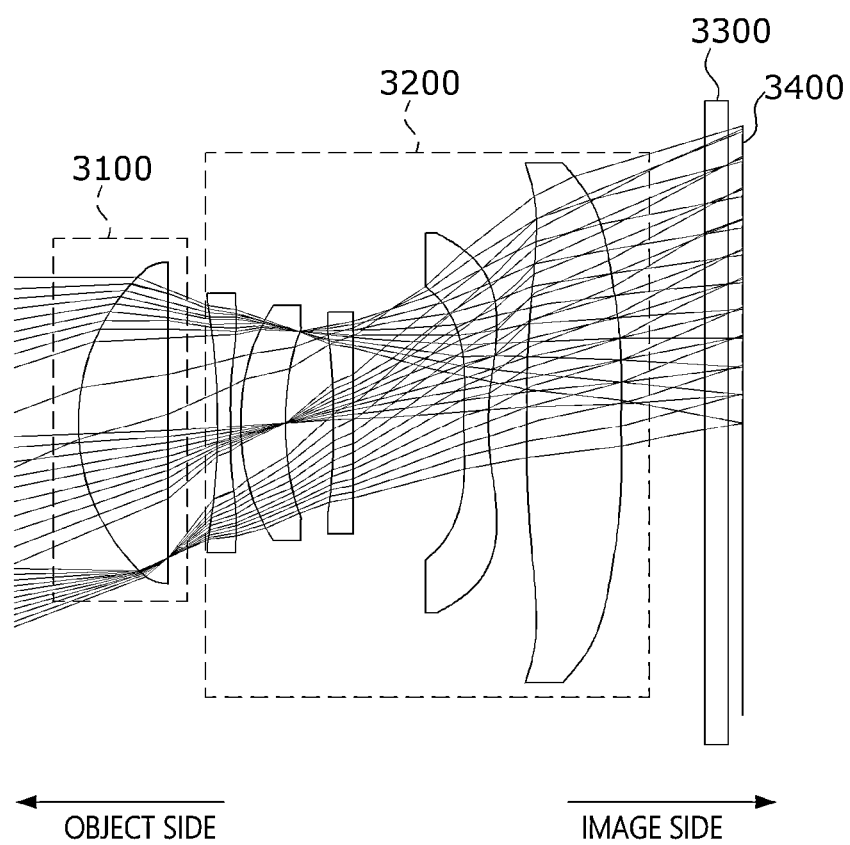

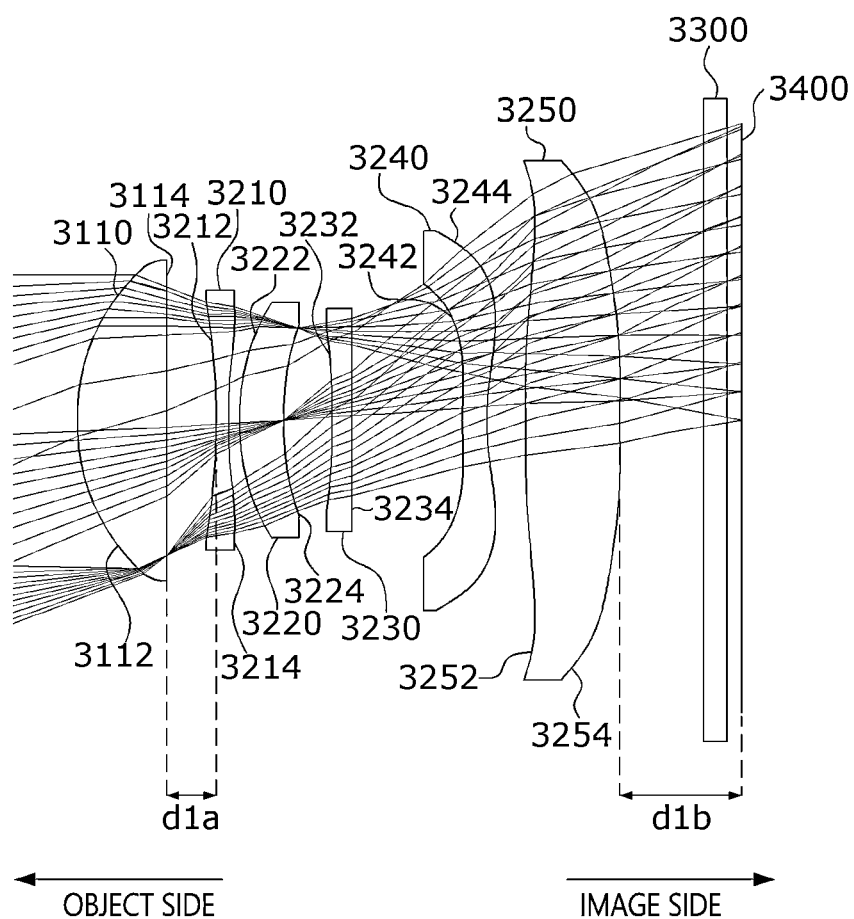
[Fig. 28]

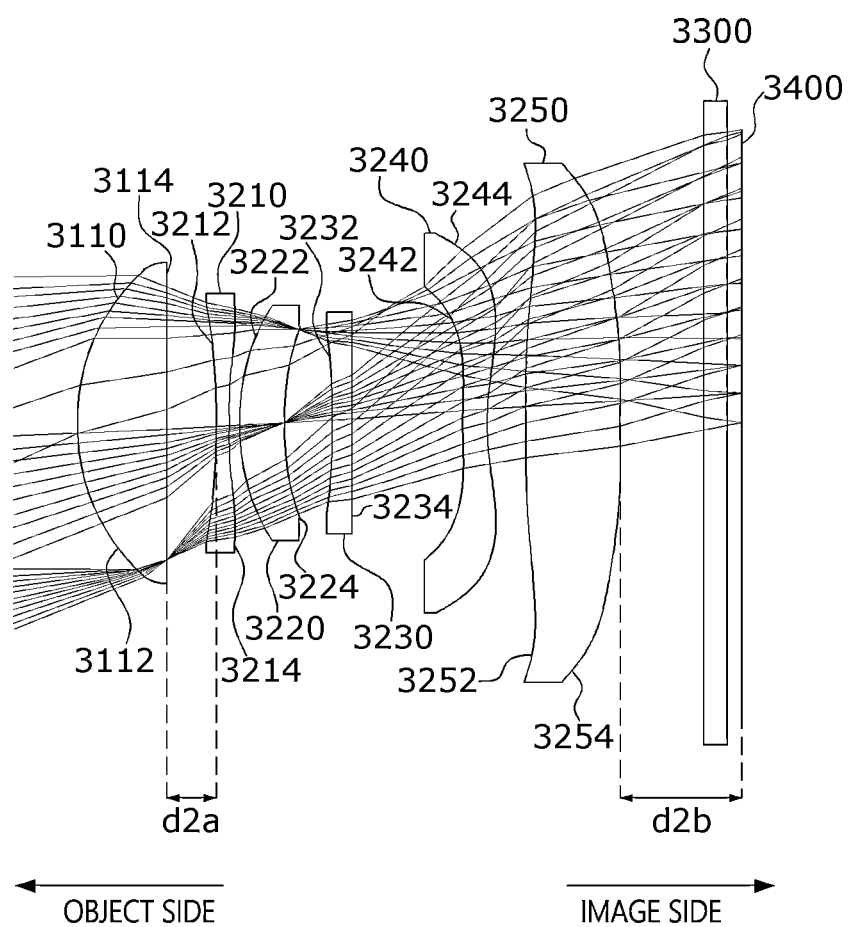
[Fig. 29]

[Fig. 30]
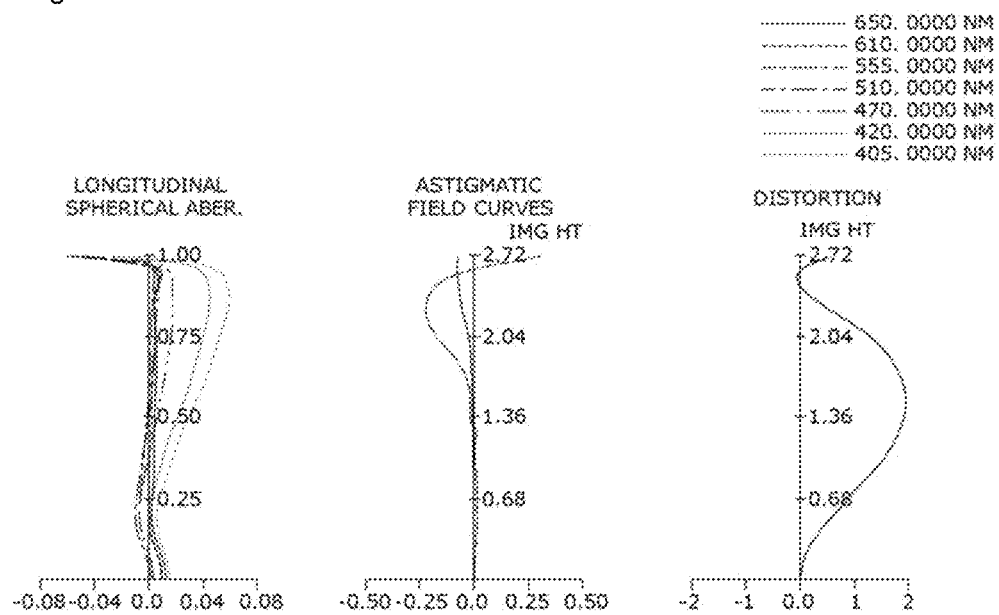
[Fig. 31]
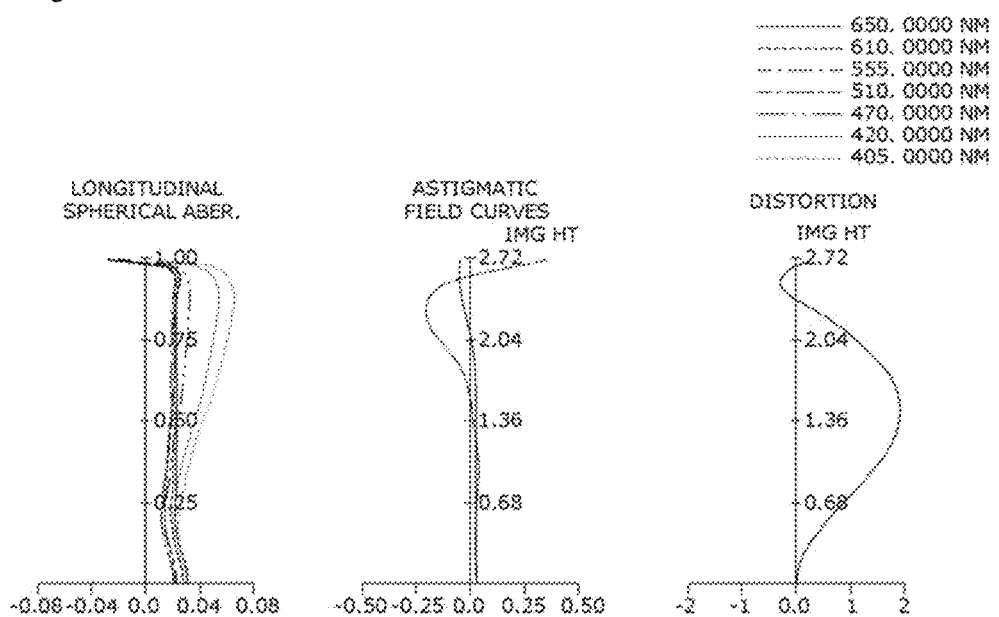

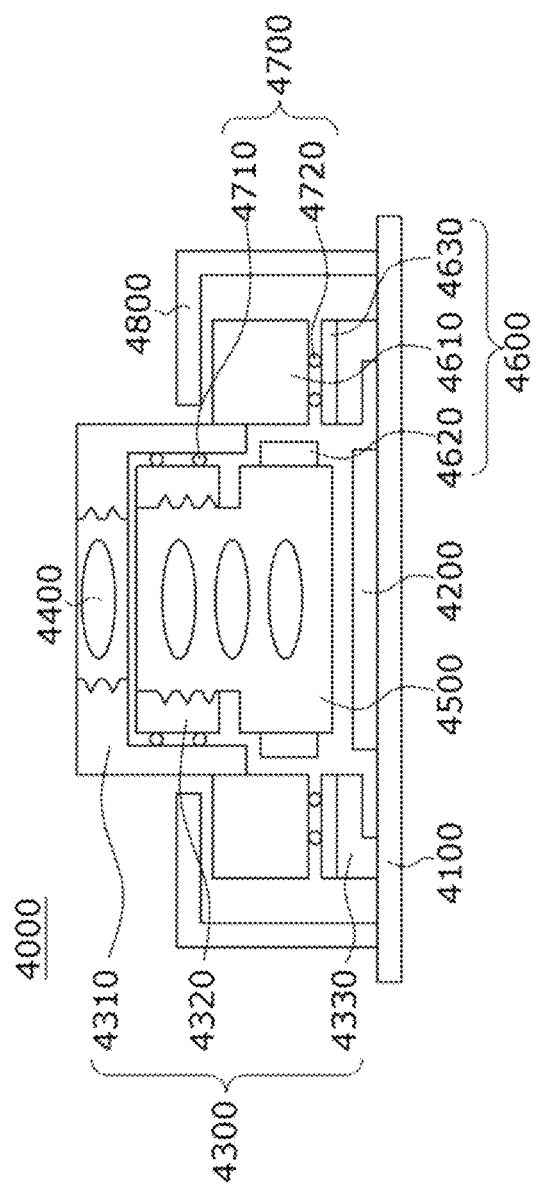
[Fig. 32]

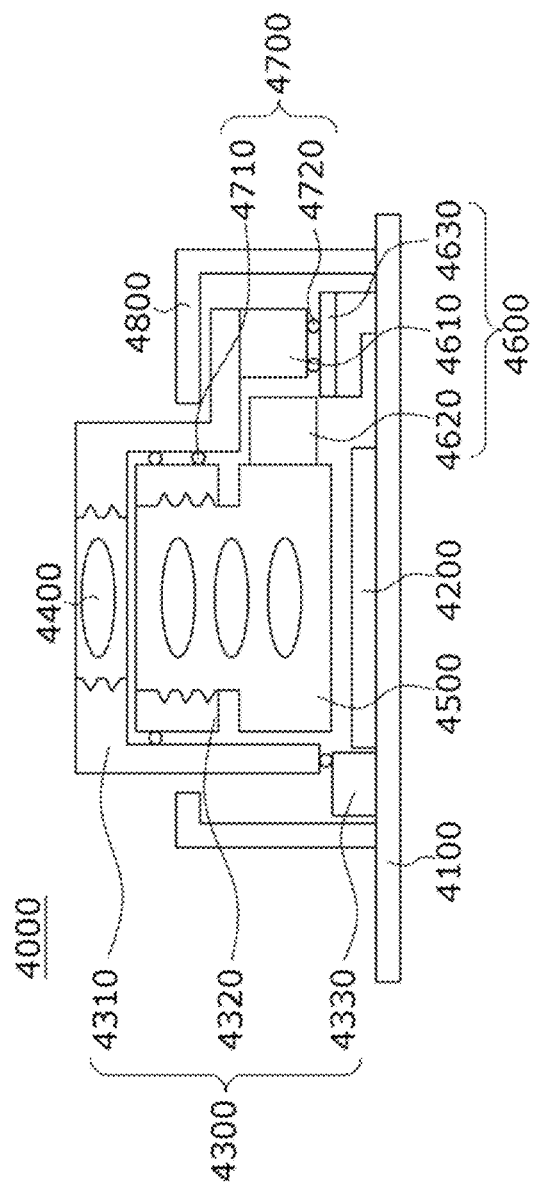

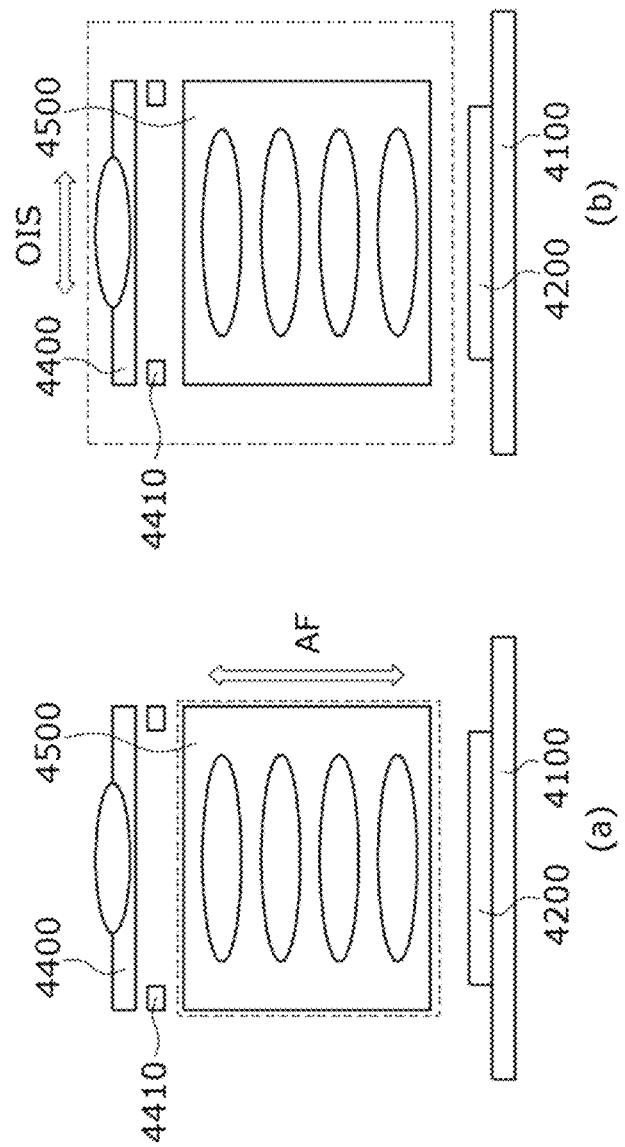

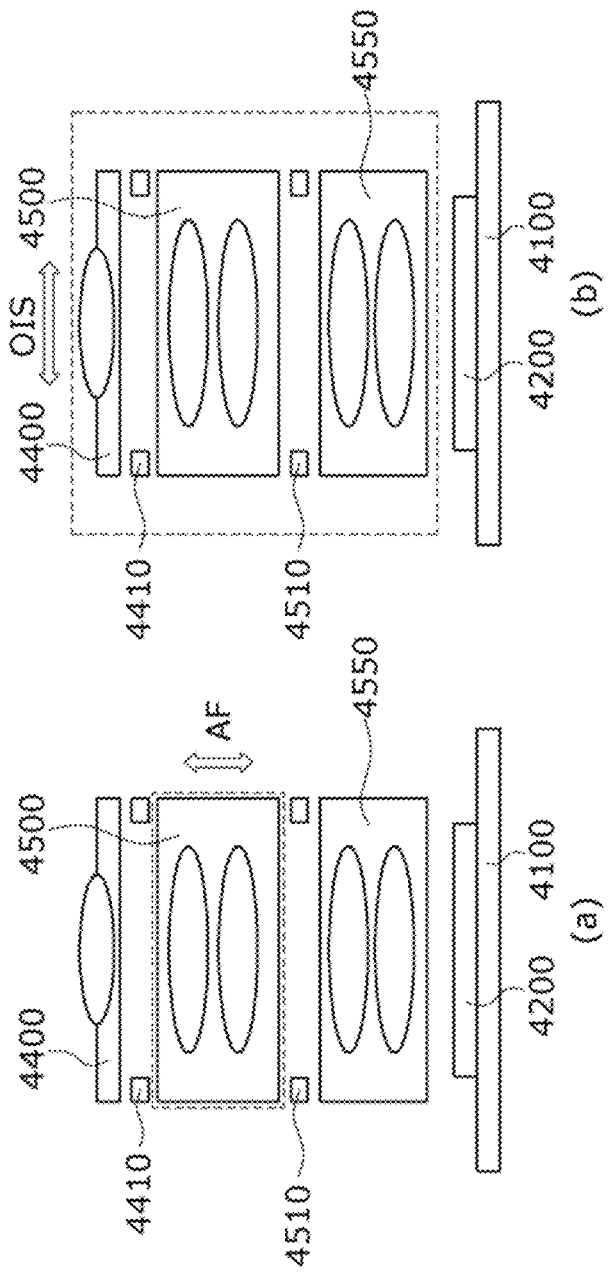

[Fig. 36]
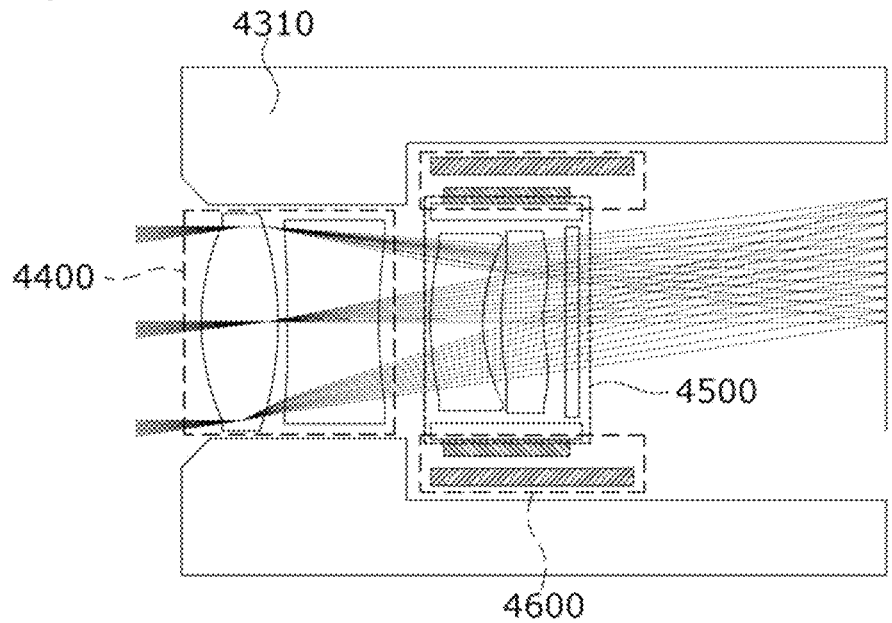
[Fig. 37]
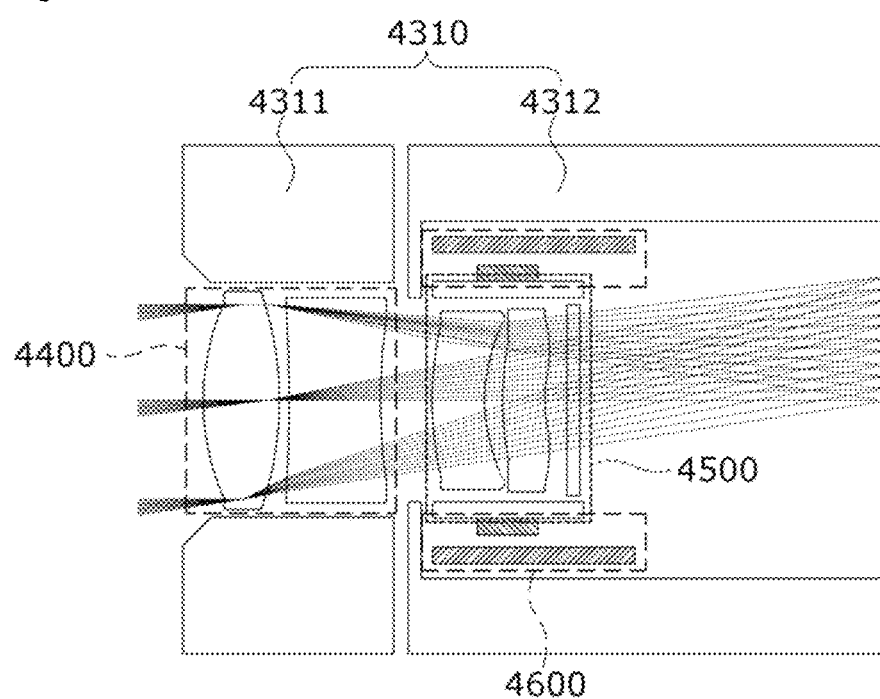

CAMERA ACTUATOR AND CAMERA DEVICE INCLUDING SAME

CROSS REFERENCE TO RELATED APPLICATIONS

This application is the National Phase of PCT International Application No. PCT/KR2020/013731, filed on Oct. 8, 2020, which claims priority under 35 U.S.C. 119(a) to Patent Application No. 10-2019-0124800, filed in the Republic of Korea on Oct. 8, 2019, and Patent Application No. 10-2020-0033329, filed in the Republic of Korea on Mar. 18, 2020, all of which are hereby expressly incorporated by reference into the present application.

TECHNICAL FIELD

The present invention relates to a camera actuator and a camera device including the same.

BACKGROUND ART

Cameras are devices that capture an image or a video of a subject and are mounted on portable devices, drones, vehicles, or the like. The camera device may have an image stabilization (IS) function for correcting or preventing image shake caused by user movement to improve image quality, an auto focusing (AF) function for automatically adjusting an interval between an image sensor and a lens to adjust a focal length of a lens, and a zooming function for increasing or decreasing a magnification of a subject at a long distance through a zoom lens to photograph the subject.

Meanwhile, in a camera module, a zoom actuator is used for a zooming function, frictional torque is generated when a lens moves due to mechanical movement of an actuator, and technical problems such as a decrease in driving force, an increase in power consumption, or the degradation of control characteristics are caused by the frictional torque.

In particular, in order to obtain the best optical characteristics using a plurality of zoom lens groups in a camera module, alignment between the plurality of lens groups and the alignment between the plurality of lens groups and an image sensor should be well made. When decentering occurs in which a center of a spherical surface between the lens groups deviates from an optical axis, a tilting phenomenon occurs in which a lens is tilted, or a phenomenon occurs in which central axes of the lens groups and the image sensor are not aligned, an angle of view changes or defocusing occurs, which adversely affects image quality or resolution.

In addition, when a zooming function, an AF function, and an optical image stabilizer (OIS) function are all included in a camera module, there is a problem in that a magnet for an OIS, a magnet for zooming, and a magnet for an AF are disposed close to each other to cause magnetic field interference.

DISCLOSURE

Technical Problem

The present invention is directed to providing a camera actuator applicable to an ultra-slim, ultra-miniature, and high-resolution camera, and a camera device including the same.

The present invention is directed to providing a camera actuator capable of precisely performing zooming and auto focusing (AF) while alignment between lens groups is maintained, and a camera device including the same.

The present invention is directed to providing an auto focusing function in a fixed zoom optical system.

The present invention is directed to providing a hand shake preventing function in a fixed zoom optical system.

The present invention is directed to providing a fixed zoom optical system of which a total track length (TTL) is fixed.

Technical Solution

According to an embodiment of the present invention, a camera device includes a base, a first lens assembly which is disposed in the base and includes a first lens group and a first lens support unit to which the first lens group is fixed, a second lens assembly which is disposed in the base and includes a second lens group and a second lens support unit to which the second lens group is fixed, and a driving unit configured to drive the second lens assembly, wherein a first stopper member and a second stopper member are formed on an inner wall of the second lens support unit and spaced apart from each other by an interval greater than a height of the first lens assembly in a moving direction of the second lens support unit, the first lens assembly is accommodated between the first stopper member and the second stopper member in the second lens support unit, and the second lens assembly is moved together with the first lens assembly in the base.

The driving unit may include a coil driving unit disposed on at least one of a first inner wall and a second inner wall, which faces the first inner wall, of the base and a magnet driving unit disposed on the second lens support unit to face the coil driving unit, and the second lens assembly may be moved along the first inner wall and the second inner wall by an interaction between the coil driving unit and the magnet driving unit.

The camera device may further include a magnet disposed on the first lens assembly, and a first yoke and a second yoke fixed at a certain interval on one surface of the base disposed to face the magnet, wherein, according to a position of the second lens assembly, an attractive force may act between the magnet and the first yoke, or an attractive force may act between the magnet and the second yoke.

In a first zooming mode, the attractive force may act between the first yoke and the magnet of the first lens assembly moved together with the second lens assembly in a first direction, and in a second zooming mode, the attractive force may act between the second yoke and the magnet of the first lens assembly moved together with the second lens assembly in a second direction opposite to the first direction.

By the attractive force acting between the magnet and the first yoke, the first lens assembly may be further moved in the first direction until the first lens assembly comes into contact with the first stopper member, and by the attractive force acting between the magnet and the second yoke, the first lens assembly may be further moved in the second direction until the first lens assembly comes into contact with the second stopper member.

The second lens assembly may perform focusing in a state in which the first lens assembly is in contact with the first stopper member or in a state in which the first lens assembly is in contact with the second stopper member.

A guide part may be disposed adjacent to at least one of a first inner wall and a second inner wall of the base, a groove corresponding to the guide part may be formed in an outer circumferential surface of the second lens support unit, and a ball may be disposed between the guide part and the groove.

The camera device may further include a guide pin fixed to the base to be parallel to an optical axis, wherein the second lens support unit may move along the guide pin.

According to an embodiment of the present invention, an optical system includes a first lens group and a second lens group which are sequentially arranged in a direction from an object toward an image and include a plurality of lenses, wherein the first lens group is fixed with respect to an image side, the second lens group is movable in an optical axis direction, when the second lens group moves from an infinity focus to a nearest focus, a separation distance between the first lens group and the second lens group increases, the first lens group has positive refractive power, the second lens group has negative refractive power, a total track length (TTL) is fixed within 7 mm, and when focusing is performed from the infinity focus to the nearest focus, a movement stroke of the second lens group is within 0.02 mm.

According to an embodiment of the present invention, a camera module includes a board, a sensor disposed on the board, a housing which is disposed on the board and includes an internal space, a first lens assembly which includes at least one lens and is coupled to the housing, a second lens assembly which includes at least one lens and is accommodated in the internal space and coupled to the housing, and a driving unit which moves the second lens assembly in an optical axis direction or moves the housing in a direction perpendicular to an optical axis, wherein the driving unit includes a magnet coupled to the housing, a first coil disposed to face the magnet and coupled to at least one side of the second lens assembly, and a second coil disposed to face the magnet and coupled to one side of the housing.

Advantageous Effects

According to embodiments of the present invention, it is possible to provide a camera actuator applicable to an ultra-slim, ultra-miniature, and high-resolution camera, and a camera device including the same. In particular, it is possible to provide a camera actuator capable of implementing a zooming function and an auto focusing (AF) function while alignment between a plurality of lens groups is maintained. In addition, according to embodiments of the present invention, step zooming can be implemented using a minimum control signal.

According to embodiments of the present invention, a total track length (TTL) can be fixed, and concurrently, both an AF function and an optical image stabilizer (OIS) function can be implemented, thereby providing advantages of miniaturization and weight reduction.

According to embodiments of the present invention, since only a second lens group is separated and moved, a weight loaded on a driving system can be reduced, thereby reducing an amount of current consumption.

DESCRIPTION OF DRAWINGS

FIG. 1 is a perspective view illustrating an example of a camera device.

FIG. 2A is a perspective view illustrating the camera shown in FIG. 1 from which a shield can is removed, and FIG. 2B is a plan view of the camera shown in FIG. 2A.

FIG. 3A is a perspective view of a first camera module shown in FIG. 2A, and FIG. 3B is a side cross-sectional view of the first camera module shown in FIG. 3A.

FIG. 4 is a perspective view of a first actuator according to an embodiment of the present invention.

FIG. 5 is a perspective view illustrating a state in which a base and a yoke are removed from the first actuator of FIG. 4.

FIG. 6 is a cross-sectional view of the first actuator in FIG. 4.

FIG. 7 is a perspective view illustrating the base and the yoke in the first actuator of FIG. 4.

FIG. 8 is an exploded perspective view of a first lens assembly and a second lens assembly of FIG. 5.

FIG. 9 shows views illustrating a movement process of an actuator device in a telephoto mode according to an embodiment of the present invention.

FIG. 10 shows views illustrating a movement process of the actuator device in a wide-angle mode according to an embodiment of the present invention.

FIG. 11A is a graph showing an interaction between a Hall sensor and a sensing magnet applied to the first actuator according to one embodiment of the present invention, FIG. 11B is a graph showing a stroke of the first lens assembly applied to the first actuator according to one embodiment of the present invention, and FIG. 11C is a graph illustrating a stroke of the second lens assembly applied to the first actuator according to one embodiment of the present invention.

FIG. 12 illustrates an example in which the second lens assembly moves along a guide pin according to an embodiment of the present invention.

FIGS. 13 and 14 illustrate an example in which the second lens assembly moves along a guide ball according to an embodiment of the present invention.

FIG. 15 is a perspective view of a second actuator of the camera device shown in FIGS. 1 to 3 in one direction.

FIG. 16 is a perspective view of the second actuator of FIG. 15 in another direction.

FIG. 17 is a perspective view of a second circuit board and a driving unit of the second actuator of FIG. 15.

FIG. 18 is a partially exploded perspective view of the second actuator of FIG. 15.

FIG. 19 is a perspective view of the second actuator of FIG. 15 from which the second circuit board is removed.

FIG. 20 illustrates an optical system according to a first embodiment of the present invention.

FIG. 21 is a cross-sectional view of the optical system at an infinity focus according to the first embodiment of the present invention.

FIG. 22 is a cross-sectional view of the optical system at an intermediate focus according to the first embodiment of the present invention.

FIG. 23 is a cross-sectional view of the optical system at a nearest focus according to the first embodiment of the present invention.

FIG. 24 shows graphs of a longitudinal spherical aberration, an astigmatic field curve, and a distortion of the optical system which are measured on light having wavelengths of 435 nm, 486 nm, 546 nm, 587 nm, and 656 nm at an infinity focus according to the first embodiment.

FIG. 25 shows graphs of a longitudinal spherical aberration, an astigmatic field curve, and a distortion of the optical system which are measured on light having wavelengths of 435 nm, 486 nm, 546 nm, 587 nm, and 656 nm at an intermediate focus according to the first embodiment.

FIG. 26 shows graphs of a longitudinal spherical aberration, an astigmatic field curve, and a distortion of the optical system which are measured on light having wavelengths of 435 nm, 486 nm, 546 nm, 587 nm, and 656 nm at a nearest focus according to the first embodiment.

FIG. 27 illustrates an optical system according to a second embodiment of the present invention.

FIG. 28 is a cross-sectional view of the optical system at an infinity focus according to the second embodiment of the present invention.

FIG. 29 is a cross-sectional view of the optical system at a nearest focus according to the second embodiment of the present invention.

FIG. 30 shows graphs of a longitudinal spherical aberration, an astigmatic field curve, and a distortion of the optical system which are measured on light having wavelengths of 435 nm, 486 nm, 546 nm, 587 nm, and 656 nm at an infinity focus according to the second embodiment.

FIG. 31 shows graphs of a longitudinal spherical aberration, an astigmatic field curve, and a distortion of the optical system which are measured on light having wavelengths of 435 nm, 486 nm, 546 nm, 587 nm, and 656 nm at a nearest focus according to the second embodiment.

FIG. 32 is a schematic view illustrating a camera module according to an embodiment of the present invention.

FIG. 33 is a schematic view illustrating a camera module according to another embodiment of the present invention.

FIG. 34 shows views for describing an operation of a driving unit according to an embodiment of the present invention.

FIG. 35 shows views for describing an operation of a driving unit according to another embodiment of the present invention.

FIG. 36 shows views for describing a structure of a housing according to an embodiment of the present invention.

FIG. 37 shows views for describing a structure of a housing according to another embodiment of the present invention.

MODES OF THE INVENTION

While the present invention is open to various modifications and alternative embodiments, specific embodiments thereof will be described and shown by way of example in the accompanying drawings. However, it should be understood that there is no intention to limit the present invention to the particular embodiments disclosed, and on the contrary, the present invention is to cover all modifications, equivalents, and alternatives falling within the spirit and scope of the present invention.

It should be understood that, although the terms including ordinal numbers such as first, second, and the like may be used herein to describe various elements, the elements are not limited by the term. These terms are only used for the purpose of distinguishing one element from another element. For example, without departing from the scope of the present invention, a second element could be termed a first element, and similarly a first element could be also termed a second element. The term "and/or" includes any one or all combinations of a plurality of associated listed items.

In the case that one component is described as being "connected" or "linked" to another component, it may be connected or linked to the corresponding component directly or other components may be present therebetween. On the other hand, in the case that one component is described as being "directly connected" or "directly linked" to another component, it should be understood that other components are not present therebetween.

It is to be understood that terms used herein are for the purpose of the description of particular embodiments and not for limitation. A singular expression includes a plural expression unless the context clearly indicates otherwise. It will further be understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless defined otherwise, all the terms (including technical and scientific terms) used herein have the same meaning as commonly understood by one of ordinary skill in the art to which the present invention belongs. It will further be understood that the terms, such as those defined in commonly used dictionaries, should be interpreted as having meanings that are consistent with their meanings in the context of the relevant art and should not be interpreted in an idealized or overly formal sense unless expressly defined otherwise herein.

Hereinafter, embodiments will be described in detail with reference to the accompanying drawings, and the same or corresponding elements will be given the same reference numbers regardless of drawing symbols, and redundant descriptions will be omitted.

FIG. 1 is a perspective view illustrating an example of a camera device, FIG. 2A is a perspective view illustrating the camera shown in FIG. 1 from which a shield can is removed, and FIG. 2B is a plan view of the camera shown in FIG. 2A.

Referring to FIG. 1, a camera device 1000 may include one or more camera modules. For example, the camera device 1000 may include a first camera module 1000A and a second camera module 1000B. The first camera module 1000A and the second camera module 1000B may be covered by a certain shield can 1510.

Referring to FIGS. 1, 2A, and 2B together, the first camera module 1000A may include one or more actuators. For example, the first camera module 1000A may include a first actuator 1100 and a second actuator 1200.

The first actuator 1100 may be electrically connected to a circuit board 1410 of a first group, the second actuator 1200 may be electrically connected to a circuit board 1420 of a second group, and although not shown, the circuit board 1420 of the second group may be electrically connected to the circuit board 1410 of the first group. The second camera module 1000B may be electrically connected to a circuit board 1430 of a third group.

The first actuator 1100 may be a zoom actuator or an auto focusing (AF) actuator. For example, the first actuator 1100 may support one or more lenses and may move the lenses according to a control signal of a certain control unit to perform an AF function or a zooming function.

The second actuator 1200 may be an optical image stabilizer (OIS) actuator.

The second camera module 1000B may include a fixed focal length lens disposed in a certain barrel (not shown). The fixed focal length lens may be referred to as a "single focal length lens" or a "single lens."

The second camera module 1000B may be disposed in a certain housing (not shown) and may include an actuator (not shown) capable of driving a lens unit. The actuator may be a voice coil motor, a micro actuator, a silicon actuator, or the like and may be applied as various types such as a capacitive type, a thermal type, a bimorph type, and an electrostatic force type, but the present invention is not limited thereto.

Next, FIG. 3A is a perspective view of the first camera module shown in FIG. 2A, and FIG. 3B is a side cross-sectional view of the first camera module shown in FIG. 3A.

Referring to FIG. 3A, the first camera module 1000A may include the first actuator 1100 configured to perform a zooming function and an AF function and the second actuator 1200 disposed at one side of the first actuator 1100 and configured to perform an OIS function.

Referring to FIG. 3B, the first actuator 1100 may include an optical system and a lens driving unit. For example, at least one of a first lens assembly 1110, a second lens assembly 1120, a third lens assembly 1130, and a guide pin 50 may be disposed in the first actuator 1100.

In addition, the first actuator 1100 may include a coil driving unit 1140 and a magnet driving unit 1160 to perform a high-magnification zooming function.

For example, the first lens assembly 1110 and the second lens assembly 1120 may be moving lenses which are moved through the coil driving unit 1140, the magnet driving unit 1160, and the guide pin 50, and the third lens assembly 1130 may be a fixed lens, but the present invention is not limited thereto. For example, the third lens assembly 1130 may perform a function of a focator for forming an image of light at a specific position, and the first lens assembly 1110 may perform a function of a variator for re-forming the image formed by the third lens assembly 1130, which is the focator, at a different position. Meanwhile, in the first lens assembly 1110, due to many changes in a distance to a subject or an image distance, a change in magnification may be large, and the first lens assembly 1110 that is the variator may play an important role in a change in focal length or magnification of an optical system. Meanwhile, an image point, at which an image is formed by the first lens assembly 1110 that is the variator, may be slightly different according to positions. Accordingly, the second lens assembly 1120 may perform a function of compensating a position of an image formed by the variator. For example, the second lens assembly 1120 may perform a function of a compensator for accurately forming an image point, at which an image is formed by the first lens assembly 1110 that is the variator, at an actual position of an image sensor 1190.

For example, the first lens assembly 1110 and the second lens assembly 1120 may be driven by an electromagnetic force generated by an interaction between the coil driving unit 1140 and the magnet driving unit 1160.

The certain image sensor 1190 may be disposed perpendicular to an optical axis direction of parallel light.

Next, the second actuator 1200 may include a shake correction unit 1220 disposed in the housing and a prism unit 1230 disposed on the shake correction unit 1220. The shake correction unit 1220 may include a shaper member 1222 and a lens member 1224 and may include a magnet driving unit 72M and a coil driving unit 72C. Here, the lens member 1224 may be used interchangeably with a liquid lens, a fluid lens, a variable prism, or the like. A shape of the lens member 1224 may be reversibly deformed by a pressure applied to a surface of the lens member 1224, thereby changing an optical path of light passing through the lens member 1224. For example, the lens member 1224 may include a fluid surrounded by an elastic membrane. The shaper member 1222 may be combined with, connected to, or in direct contact with the lens member 1224, and pressure may be applied to the lens member 1224 due to movement of the shaper member 1222. Thus, the shape of the lens member 1224 may be reversibly deformed, thereby changing an optical path of light passing through the lens member 1224. As will be described below, the movement of the shaper member 1222 may occur due to an interaction between the magnet driving unit 72M and the coil driving unit 72C.

As described above, an OIS can be implemented by controlling an optical path of light passing through the lens member 1224, thereby minimizing the occurrence of a decentering or tilting phenomenon and providing superior optical characteristics.

Since FIGS. 1 to 3 and descriptions with reference thereto are provided for the purpose of describing the overall structure and operation principle of the camera device according to the embodiment of the present invention, embodiments of the present invention are not limited to the detailed configuration shown in FIGS. 1 to 3.

Hereinafter, the first actuator for implementing a zooming function and an AF function according to the embodiment of the present invention will be described in more detail.

FIG. 4 is a perspective view of the first actuator according to the embodiment of the present invention. FIG. 5 is a perspective view illustrating a state in which a base and a yoke are removed from the first actuator of FIG. 4. FIG. 6 is a cross-sectional view of the first actuator in FIG. 4. FIG. 7 is a perspective view illustrating the base and the yoke in the first actuator of FIG. 4. FIG. 8 is an exploded perspective view of the first lens assembly and the second lens assembly of FIG. 5. For reference, according to FIG. 3B, although the first actuator 1100 for implementing a zooming function and an AF function is illustrated as including the first lens assembly 1110, the second lens assembly 1120, and the third lens assembly 1130, since embodiments of the present invention mainly relate to the structures of the first lens assembly 1110 and the second lens assembly 1120 which are the moving lenses, the illustration and description of the third lens assembly 1130, which is the fixed lens, will be omitted below.

Referring to FIGS. 4 to 8, the first actuator 1100 includes a base 20, the first lens assembly 1110, the second lens assembly 1120, and the third lens assembly (not shown).

The first lens assembly 1110 and the second lens assembly 1120 are disposed in the base 20, and the first lens assembly 1110 includes a first lens group 100 and a first lens support unit 110. The first lens group 100 may be accommodated in the first lens support unit 110 and may be fixed to the first lens support unit 110. The second lens assembly 1120 includes a second lens group 200 and a second lens support unit 210. The second lens group 200 may be accommodated in the second lens support unit 210 and may be fixed to the second lens support unit 210.

According to an embodiment of the present invention, the first lens assembly 1110 is accommodated in the second lens support unit 210 of the second lens assembly 1120. To this end, the second lens support unit 210 may include an area surrounding an edge of the second lens group 200 and an area accommodating the first lens assembly 1110. Accordingly, when the second lens assembly 1120 moves, the first lens assembly 1110 may move together with the second lens assembly 1120 without a separate component for driving the first lens assembly 1110, and a magnification may be adjusted according to positions and intervals of the first lens group 100 in the first lens assembly 1110, the second lens group 200 in the second lens assembly 1120, a third lens group (not shown) in the third lens assembly (not shown), and an image sensor (not shown).

In order to move the second lens assembly 1120, a coil driving unit (not shown) may be disposed on each of a first inner wall 21 and a second inner wall 22 of the base 20, and a magnet driving unit 1160 may be disposed on each of a first outer wall 211 of the second lens support unit 210 facing the first inner wall 21 of the base 20 and a second outer wall 212 of the second lens support unit 210 facing the second inner wall 22 of the base 20. By an electromagnetic interaction between the coil driving unit (not shown) and the magnet driving unit 1160, the second lens support unit 210 may be moved along the first inner wall 21 and the second inner wall 22 of the base 20, and the first lens assembly 1110 accommodated in the second lens support unit 210 may be moved together with the second lens support unit 210. That is, a distance or direction in which the second lens support unit 210 moves together with the magnet driving unit 1160 may vary according to an amount or direction of a current flowing through the coil driving unit (not shown). In this case, the second lens support unit 210 may move along the base 20 through a guide pin, a guide ball, or a guide rail, and a detailed example thereof will be described below.

Meanwhile, according to an embodiment of the present invention, a sensor unit may be further disposed to detect positions of the second lens assembly 1120 and the first lens assembly 1110 accommodated in the second lens support unit 210 of the second lens assembly 1120 and control movements thereof. The sensor unit may include a sensing magnet 1170 and a Hall sensor (not shown). The sensing magnet 1170 may be fixed to the second lens support unit 210 to move together with the second lens support unit 210. The Hall sensor (not shown) may be disposed adjacent to the coil driving unit (not shown). For example, the Hall sensor may be disposed adjacent to at least one of the coil driving unit disposed on the first inner wall 21 of the base 20 and the coil driving unit disposed on the second inner wall 22 of the base 20. For example, the Hall sensor may be disposed in an inner circumferential portion of a coil wound to constitute the coil driving unit. The Hall sensor (not shown) may detect a magnetic field of the sensing magnet 1170 and may detect a position of the sensing magnet 1170 according to an intensity of the magnetic field. Since the sensing magnet 1170 moves together with the second lens support unit 210, positions of the first lens assembly 1110 and the second lens assembly 1120 may be detected according to the position of the sensing magnet 1170, and based on detection results, a control signal for adjusting a magnification may be generated so that a voltage according to the control signal may be applied to the coil driving unit (not shown).

As described above, according to an embodiment of the present invention, the first lens assembly 1110 is accommodated in the second lens support unit 210 of the second lens assembly 1120 and thus is moved together with the second lens support unit 210 as the second lens support unit 210 is moved. Accordingly, since there is no need to separately control movement of the first lens assembly 1110 and the second lens assembly 1120, it is possible to minimize the occurrence of a decentering or tilting phenomenon and obtain superior optical characteristics.

More specifically, in order for the second lens support unit 210 to accommodate the first lens assembly 1110, a first stopper member 213 and a second stopper member 214 may be formed on an inner wall of the second lens support unit 210. The first stopper member 213 and the second stopper member 214 may be spaced apart from each other by a certain interval D, and the first lens assembly 1110 may be accommodated between the first stopper member 213 and the second stopper member 214. In this case, the interval D between the first stopper member 213 and the second stopper member 214 may be greater than a height H of the first lens assembly 1110. In addition, an inner diameter of the second lens support unit 210 may be greater than an outer diameter of the first lens assembly 1110. Accordingly, the first lens assembly 1110 may move together with the second lens assembly 1120 and may move between the first stopper member 213 and the second stopper member 214 of the second lens support unit 210.

Meanwhile, one or more magnets 300 may be further disposed on the first lens assembly 1110, and at least two yokes 400 and 410 fixed at a certain interval may be further disposed on at least one surface of the base 20 disposed to face the magnet 300.

Here, the yokes 400 and 410 are made of a metal with magnetism, and when the yokes 400 and 410 approach the magnet 300 within a certain distance, an attractive force acts between the yokes 400 and 410 and the magnet 300. That is, according to a position of the second lens assembly 1120, an attractive force may act between the magnet 300 of the first lens assembly 1110 and a first yoke 400, or an attractive force may act between the magnet 300 of the first lens assembly 1110 and a second yoke 410.

To this end, the magnet 300 may be disposed on the first lens assembly 1110 to face a third inner wall 23 between the first inner wall 21 and the second inner wall 22 of the base 20, and the first yoke 400 and the second yoke 410 may be disposed apart from each other on the third inner wall 23. Similarly, the magnet 300 may be further disposed on the first lens assembly 1110 to face a fourth inner wall 24 facing the third inner wall 23 of the base 20, and a third yoke 420 and a fourth yoke 430 may be disposed apart from each other on the fourth inner wall 24. In this case, the magnet 300 disposed to face the third inner wall 23 and the magnet 300 disposed to face the fourth inner wall 24 may be disposed symmetrically with each other, the first yoke 400 and the third yoke 420 may be symmetrical with each other, and the second yoke 410 and the fourth yoke 430 may be disposed symmetrically with each other.

In order to describe the structure and operation principle of the first actuator according to the embodiment of the present invention in more detail, FIG. 9 shows views illustrating a movement process of an actuator device in a telephoto mode according to an embodiment of the present invention, and FIG. 10 shows views illustrating a movement process of the actuator device in a wide-angle mode according to an embodiment of the present invention.

FIG. 9A is a side view illustrating a case in which the second lens assembly 1120 moves in a first direction while accommodating the first lens assembly 1110 in the telephoto mode. FIG. 9B is a perspective view of the case of FIG. 9A. FIG. 9C is a part of a top view of the case of FIG. 9B. FIG. 9D is a perspective view illustrating a case in which the first lens assembly 1110 in FIG. 9 B is further moved in the first direction by an attractive force with the first yoke 400, and FIG. 9A is a part of a top view of FIG. 9D. When a current is applied to the coil driving unit (not shown) to perform zooming in the telephoto mode, by an interaction between the coil driving unit (not shown) and the magnet driving unit 1160, the second lens assembly 1120 to which the magnet driving unit 1160 is fixed is moved to a certain distance in the first direction. A position of the second lens assembly 1120 may be detected by an interaction between the sensing magnet 1170 fixed to the second lens assembly 1120 to move together with the second lens assembly 1120 and the Hall sensor disposed adjacent to the coil driving unit (not shown). That is, the Hall sensor (not shown) may detect a magnetic field of the sensing magnet 1170 to detect a position of the sensing magnet 1170, that is, a position of the second lens assembly 1120. In this case, the first lens assembly 1110 moves in the first direction together with the second lens assembly 1120 in a state of being caught by the second stopper member 214. Thus, an attractive force may act between the magnet 300 on the first lens assembly 1110 and the first yoke 400, the first lens assembly 1110 may be further moved in the first direction by the attractive force acting between the magnet 300 and the first yoke 400 until the first lens assembly 1110 comes into contact with the first stopper member 213 to be caught by the first stopper member 213. Accordingly, the first actuator may perform zooming in the telephoto mode. To this end, the first lens assembly 1110 and the second lens support unit 210 may not be connected to each other through a separate coupling member or an adhesive member, and the first lens assembly 1110 may freely be moved between the first stopper member 213 and the second stopper member 214 of the second lens support unit 210.

Meanwhile, in a state in which the first lens assembly 1110 is fixed to the first stopper member 213, the second lens assembly 1120 is finely moved in the first direction or a second direction, for example, within a distance of 0.6 mm to perform focusing. In this case, a position of the second lens assembly 1120 may be detected by an interaction between the sensing magnet 1170 fixed to the second lens assembly 1120 to move together with the second lens assembly 1120 and the Hall sensor disposed adjacent to the coil driving unit (not shown).

FIG. 10A is a side view illustrating a case in which the second lens assembly 1120 moves in the second direction while accommodating the first lens assembly 1110 in the wide-angle mode. FIG. 10B is a perspective view of the case of FIG. 10A. FIG. 10C is a part of a top view of the case of FIG. 10B. FIG. 10D is a perspective view illustrating a case in which the first lens assembly 1110 in FIG. 10B is further moved in the second direction by an attractive force with the second yoke 410. FIG. 10E is a part of a top view of the case of FIG. 10D. When a current is applied to the coil driving unit (not shown) to perform zooming in wide-angle mode, by an interaction between the coil driving unit (not shown) and the magnet driving unit 1160, the second lens assembly 1120 to which the magnet driving unit 1160 is fixed is moved to a certain distance in the second direction. A position of the second lens assembly 1120 may be detected by an interaction between the sensing magnet 1170 fixed to the second lens assembly 1120 to move together with the second lens assembly 1120 and the Hall sensor disposed adjacent to the coil driving unit (not shown). That is, the Hall sensor (not shown) may detect a magnetic field of the sensing magnet 1170 to detect a position of the sensing magnet 1170, that is, a position of the second lens assembly 1120. In this case, the first lens assembly 1110 moves in the second direction together with the second lens assembly 1120 in a state of being caught by the first stopper member 213. Thus, an attractive force may act between the magnet 300 on the first lens assembly 1110 and the second yoke 410, the first lens assembly 1110 may be further moved in the second direction by the attractive force acting between the magnet 300 and the second yoke 410 until the first lens assembly 1110 comes into contact with the second stopper member 214 to be caught by the second stopper member 214. Accordingly, the first actuator may perform zooming in the wide-angle mode.

Meanwhile, in a state in which the first lens assembly 1110 is fixed to the second stopper member 214, the second lens assembly 1120 is finely moved in the first direction or the second direction, for example, within a distance of 0.6 mm to perform focusing. In this case, a position of the second lens assembly 1120 may be detected by an interaction between the sensing magnet 1170 fixed to the second lens assembly 1120 to move together with the second lens assembly 1120 and the Hall sensor disposed adjacent to the coil driving unit (not shown).

Here, for convenience of description, an example of only two zooming modes, that is, the wide-angle mode and the telephoto mode, has been described, but the present invention is not limited thereto. According to an embodiment of the present invention, a magnification can be gradually adjusted in two or more zooming modes according to a position of the yoke and under control of the driving unit.

FIG. 11A is a graph showing an interaction between a Hall sensor and a sensing magnet applied to the first actuator according to an embodiment of the present invention. FIG. 11B is a graph showing a stroke of the first lens assembly applied to the first actuator according to an embodiment of the present invention. FIG. 11C is a graph illustrating a stroke of the second lens assembly applied to the first actuator according to an embodiment of the present invention.

Referring to FIG. 11A, a horizontal axis indicates a digital code, and a vertical axis indicates a magnetic field. A magnetic field sensed by the Hall sensor may vary according to a position of the sensing magnet, and the Hall sensor may generate or output a digital code according to the sensed magnetic field. Here, the Hall sensor may distinguish and sense an N pole and an S pole. To this end, the Hall sensor may include two Hall sensors. For example, when Hall sensor 1 in FIG. 11A shows a relationship between the N pole and the digital code, Hall sensor 2 shows a relationship between the S pole and the digital code. Alternatively, when Hall sensor 1 shows the relationship between the S pole and the digital code, Hall sensor 2 shows the relationship between the N pole and the digital code.

According to an embodiment of the present invention, a section A in which both the Hall sensor 1 and the Hall sensor 2 have high magnetic fields may be a use section of the sensing magnet. That is, only when a digital code output from the Hall sensor has a value within the section A, it is possible to control and move the first lens assembly 1110 or the second lens assembly 1120.

Meanwhile, referring to FIG. 11B, a horizontal axis indicates a control code, and a vertical axis indicates a stroke of the first lens assembly. Referring to FIG. 11C, a horizontal axis indicates a control code, and a vertical axis indicates a stroke of the second lens assembly.

Referring to FIG. 11B, it can be seen that the stroke of the first lens assembly, that is, a variable magnification is rapidly changed in a certain control code (for example, about 400). In addition, referring to FIG. 11C, it can be seen that the stroke of the second lens assembly is rapidly changed in a certain control code (for example, about 720).

Therefore, after a certain control code (for example, about 400) is input to the coil driving unit (not shown) to move the first lens assembly 1110 and the second lens assembly 1120 together and perform zooming, a certain control code (for example, about 720) may be input to finely move the second lens assembly 1120 and perform focusing.

Meanwhile, as described above, the second lens assembly 1120 may move along the first inner wall 21 and the second inner wall 22 of the base 20 while accommodating the first lens assembly 1110, and in this case, the second lens assembly 1120 may move through a guide pin, a guide ball, or a guide rail.

FIG. 12 illustrates an example in which the second lens assembly moves along a guide pin according to an embodiment of the present invention.

Referring to 12, the guide pin 50 may be disposed parallel to an optical axis, and an end of the guide pin 50 may be attached to the base 20 or a fixing member in the first actuator (for example, the third lens assembly, or the like). The guide pin 50 may be fitted to pass through a guide hole 215 formed in the second lens support unit 210 of the second lens assembly 1120, and the second lens assembly may be moved along the guide pin 50.

FIGS. 13 and 14 illustrate an example in which the second lens assembly moves along a guide ball according to an embodiment of the present invention.

Referring to FIG. 13, a guide part 25 may be disposed adjacent to at least one of the first inner wall 21 and the second inner wall 22 of the base 20, and a recess 26 may be formed in the guide part 25 along an optical axis. Although not shown, the guide part 25 may be fixed to at least one of the first inner wall 21 and the second inner wall 22 of the base.

Referring to FIG. 14, a groove 216 corresponding to the recess 26 of the guide part 25 may be formed in an outer circumferential surface of the second lens support unit 210. The second lens assembly 1120 may be moved by a ball 55 disposed between the recess 26 of the guide part 25 and the groove 216. As describe above, when the guide part 25 is further disposed between the first inner wall 21 and the second inner wall 22 of the base 20 and the outer circumferential surface of the second lens support unit 210, frictional resistance is reduced by reducing frictional torque generated during movement of the lens assembly, thereby obtaining technical effects of improving a driving force, reducing power consumption, and improving control characteristics during zooming. Accordingly, during zooming, it is possible to minimize frictional torque and also prevent a phenomenon in which a lens is decentered or tilted or central axes of a lens group and an image sensor are not aligned, thereby providing a combined technical effect of considerably improving image quality or resolution.

Although not shown, two guide parts 25 may be disposed adjacent to the first inner wall 21 and the second inner wall 22 to be symmetrical with each other, and the grooves 216 may be formed symmetrically with each other in the outer circumferential surface of the second lens support unit 210 to face the first inner wall 21 and the second inner wall 22.

Although not shown, the guide part 25 may be omitted, and the recess 26 may be formed directly in at least one of the first inner wall 21 and the second inner wall 22.

Hereinafter, the detailed structure of the second actuator will be described in more detail.

FIG. 15 is a perspective view of the second actuator of the camera device shown in FIGS. 1 to 3 in one direction. FIG. 16 is a perspective view of the second actuator of FIG. 15 in another direction. FIG. 17 is a perspective view of a second circuit board and a driving unit of the second actuator of FIG. 15. FIG. 18 is a partially exploded perspective view of the second actuator of FIG. 15. FIG. 19 is a perspective view of the second actuator of FIG. 15 from which the second circuit board is removed.

Referring to FIGS. 15 to 19, the shake correction unit 1220 is disposed under the prism unit 1230 to solve a restriction on a size of a lens of a lens assembly in an optical system when an OIS is implemented, thereby securing a sufficient amount of light.

A second circuit board 1250 may be connected to a certain power supply (not shown) to apply power to the coil driving unit 72C. The second circuit board 1250 may include a circuit board having an electrically connectable line pattern, such as a rigid printed circuit board (rigid PCB), a flexible PCB, or a rigid flexible PCB.

The coil driving unit 72C may include one or more unit coil driving units and may include a plurality of coils. For example, the coil driving unit 72C may include a first unit coil driving unit 72C1, a second unit coil driving unit 72C2, a third unit coil driving unit 72C3, and a fourth unit coil driving unit (not shown).

In addition, the coil driving unit 72C may further include Hall sensors (not shown) to detect a position of the magnet driving unit 72M to be described below. For example, the first unit coil driving unit 72C1 may include a first Hall sensor (not shown), and the third unit coil driving unit 72C3 may include a second Hall sensor (not shown).

Meanwhile, as described above, the shaper member 1222 may be disposed on the lens member 1224, and the shape of the lens member 1224 may be deformed according to movement of the shaper member 1222. In this case, the magnet driving unit 72M may be disposed on the shaper member 1222, and the coil driving unit 72C may be disposed in the housing 1210.

Referring to FIG. 18, in the housing 1210, a certain opening 1212H through which light may pass may be formed in a housing body 1212. The housing 1210 may include a housing side portion 1214P extending upward from the housing body 1212 and having a hole 1214H formed such that the coil driving unit 72C is disposed therein.

For example, the housing 1210 may include a first housing side portion 1214P1 extending upward from the housing body 1212 and having a hole 1214H1 formed such that the coil driving unit 72C is disposed therein and a second housing side portion 1214P2 having a hole 1214H2 formed such that the coil driving unit 72C is disposed therein.

According to an embodiment, the coil driving unit 72C may be disposed on the housing side 1214P, the magnet driving unit 72M may be disposed on the shaper member 1222, and the shaper member 1222 may be moved by an electromagnetic force between the coil driving unit 72C and the magnet driving unit 72M according to a voltage applied to the coil driving unit 72C. Accordingly, the shape of the lens member 1224 is reversibly deformed, and an optical path of light passing through the lens member 1224 is changed, thereby implementing an OIS.

More specifically, the shaper member 1222 may include a shaper body having a hole, through which light may pass, formed therein, and protrusions extending laterally from the shaper body. The lens member 1224 may be disposed under the shaper body, and the magnet driving unit 72M may be disposed on the protrusion of the shaper member 1222. For example, a part of the magnet driving unit 72M may be disposed on the protrusion disposed at one side of the shaper member 1222, and the remaining part thereof may be disposed on the protrusion disposed at the other side of the shaper member 1222. In this case, the magnet driving unit 72M may be disposed to be coupled to the shaper member 1222. For example, a groove may be formed in the protrusion of the shaper member 1222, and the magnet driving unit 72M may be fitted into the groove.

Meanwhile, a fixed prism 1232 may be a right-angled prism and may be disposed inside the magnet driving unit 72M of the shake correction unit 1220. In addition, a certain prism cover 1234 may be disposed at an upper side of the fixed prism 1232 so that the fixed prism 1232 may be pressed against and coupled to the housing 1210.

FIG. 20 illustrates an optical system according to a first embodiment of the present invention.

Referring to FIG. 20, the optical system according to the first embodiment of the present invention includes a first lens group 2100 and a second lens group 2200 sequentially arranged in a direction from an object toward an image. Here, the lens groups may correspond to the lens groups described above with reference to FIGS. 1 to 19.

According to an embodiment of the present invention, the first lens group 2100 includes a plurality of lenses. The first lens group 2100 is fixed with respect to an image side. That is, the plurality of lenses may be fixed with respect to the image side. In this case, the first lens group 2100 may include two or more lenses. When the first lens group 2100 includes three or more lenses, an overall size of the optical system may increase. According to an embodiment, the first lens group 2100 may include two lenses. In this case, the first lens group 2100 may include a first lens and a second lens.

The first lens group 2100 may have positive refractive power. The first lens group 2100 may have an effective focal length (EFL) in a range of greater than 8 mm and less than 9 mm. The first lens group 2100 may have an EFL in a range of greater than 8 mm and less than 8.5 mm. The first lens group 2100 may have an EFL in a range of greater than 8 mm and less than 8.1 mm. Preferably, the first lens group 2100 may have an EFL of 8.0991 mm.

The second lens group 2200 includes a plurality of lenses. The second lens group 2200 may include two or more lenses. When the second lens group 2200 includes three or more lenses, a size and weight of the second lens group 2200 may increase, and driving power may increase during movement. According to an embodiment, the second lens group 2200 may include two lenses. The second lens group 2200 may include a third lens and a fourth lens.

The second lens group 2200 may include one filter. The filter may include an infrared (IR) filter. Accordingly, the filter may block near-infrared rays, for example, light having a wavelength of 700 nm to 1100 nm, from light entering a camera module. An image sensor 2400 may be connected to a printed circuit board through a wire. Alternatively, the filter may include a foreign material prevention filter and the IR filter sequentially disposed in the direction from the object to the image. When the filter includes the foreign material prevention filter, foreign materials generated while the second lens group 2200 moves may be prevented from being introduced into the IR filter or the image sensor 2400.

The second lens group 2200 may move in a direction parallel to an optical axis. That is, the plurality of lenses may move along a central axis of the lenses. A focus may be adjusted according to movement of the second lens group 2200. Accordingly, the second lens group 2200 may serve as a focusing group.

The second lens group 2200 may move from an infinity focus to a nearest focus. When the second lens group 2200 moves from the infinity focus to the nearest focus, a distance between the first lens group 2100 and the second lens group 2200 may increase. The second lens group 2200 may move from the nearest focus to the infinity focus. When the second lens group 2200 moves from the nearest focus to the infinity focus, the distance between the first lens group 2100 and the second lens group 2200 may decrease.

The optical system according to the embodiment of the present invention may be a fixed zoom optical system of which a focus is adjusted according to the movement of the second lens group 2200. Accordingly, a magnification of the optical system may not increase or decrease according to the movement of the second lens group 2200.

According to an embodiment of the present invention, a movement stroke of the second lens group 2200 may be less than 0.02 mm. Here, the movement stroke may be a distance by which the lens group may be moved by a driving unit. Thus, the second lens group 2200 may move within 0.02 mm when moving from the infinity focus to the nearest focus. Since the movement stroke of the second lens group 2200 is implemented within 0.02 mm, the driving unit for driving the second lens group 2200 can be miniaturized. Accordingly, it is possible to miniaturize the camera module, and it is advantageous for the camera module to be mounted on a small electronic device such as a portable terminal.

The second lens group 2200 may have negative refractive power. The second lens group 2200 may have an effective focal length (EFL) in a range of greater than −12 mm and less than −11 mm. The second lens group 2200 may have an EFL in a range of greater than −12 mm and less than −11.5 mm. Preferably, the second lens group 2200 may have an EFL of −11.4327 mm.

The first lens group 2100 and the second lens group 2200 may move in a direction perpendicular to the optical axis. The first lens group 2100 and the second lens group 2200 may move in a direction parallel to a surface of the image sensor 2400. The first lens group 2100 and the second lens group 2200 may move integrally when moving in the direction perpendicular to the optical axis. The first lens group 2100 and the second lens group 2200 may implement an OIS while moving in the direction perpendicular to the optical axis.

According to an embodiment of the present invention, the optical system may have a total track length (TTL) that is less than 7 mm. Here, the TTL may be a distance from the surface of the image sensor to a first surface of the optical system. For example, the TTL may be a distance from a surface of the first lens group 2100 closest to the object to an upper surface of the image sensor 2400 on which light is incident. In the present specification, the TTL may be used interchangeably with a full-length distance. In the optical system according to the embodiment of the present invention, the TTL is fixed because, while the second lens group 2200 disposed between the first lens group 2100 and the image sensor 2400 is moved in an optical axis direction, a focus is adjusted. According to an embodiment, in the optical system, the TTL may be fixed within 7 mm.

According to an embodiment of the present invention, the plurality of lenses included in the first lens group 2100 and the second lens group 2200 may be lenses to which a D-cut technique is applied. The plurality of lenses included in the first lens group 2100 and the second lens group 2200 may be D-cut lenses in which portions of upper and lower portions are cut. In this case, in the upper and lower portions of the plurality of lenses, ribs and portions of effective diameters may be cut, or only the ribs may be cut without the effective diameters being cut. According to an embodiment, the second lens group 2200 may include a lens in which a value obtained by dividing a major axis length of an effective diameter by a minor axis length of the effective diameter is 1. That is, the major axis length of the effective diameter may be the same as the minor axis length of the effective diameter. For example, in the case of the third lens 2210, the fourth lens 2220, and the fourth lens 2230, only ribs of upper and lower portions may be cut, and effective diameters thereof may not be cut. In the case of a circular type lens, there is a problem in that a volume of the lens is increased due to a height in a vertical direction, but as in the embodiment of the present invention, by applying a D-cut to the upper and lower portions of the plurality of lenses, a height in the vertical direction can be decreased, thereby reducing a volume of the lens.

Hereinafter, examples of various embodiments of the present invention will be described in more detail.

FIG. 21 is a cross-sectional view of the optical system at an infinity focus according to the first embodiment of the present invention. FIG. 22 is a cross-sectional view of the optical system at an intermediate focus according to the first embodiment of the present invention. FIG. 23 is a cross-sectional view of the optical system at a nearest focus according to the first embodiment of the present invention.

Referring to FIGS. 21 to 23, the optical system includes the first lens group 2100 and the second lens group 2200 sequentially arranged in a direction from an object toward an image. The first lens group 2100 may include a first lens 2110 and a second lens 2120 sequentially arranged in the direction from the object to the image, and the second lens group 2200 may include a third lens 2210, a fourth lens 2220, and a filter 2300 sequentially arranged in the direction from the object toward the image.

Here, the first lens 2110 may include a convex object side surface 2112 and a convex image side surface 114. The second lens 2120 may include a concave object side surface 2122 and a concave image side surface 2124.

The third lens 2210 may include a convex object side surface 2212 and a concave image side surface 2214. The fourth lens 2220 may include a convex object side surface 2222 and a concave image side surface 2224.

In FIG. 21, when a distance between the first lens group 2100 and the second lens group 2200 is d1a and a distance between the second lens group 2200 and the image sensor is d2a, the optical system may have an infinity focus. In FIG. 22, when the distance between the first lens group 2100 and the second lens group 2200 is d1b and the distance between the second lens group 2200 and the image sensor is d2b, the optical system may have an intermediate focus. For example, the optical system may have a focus at a distance of 5 m. In FIG. 23, when the distance between the first lens group 2100 and the second lens group 2200 is d1c and the distance between the second lens group 2200 and the image sensor is d2c, the optical system may have a nearest focus. For example, the optical system may have a focus at a distance of 1 m.

In the optical system, when the second lens group 2200 moves from a position of FIG. 21 to a position of FIG. 23 through a position of FIG. 22, the distance between the first lens group 2100 and the second lens group 2200 increases, and the distance between the second lens group 2200 and the image sensor decreases. Therefore, a relationship of d1a<d2b<d2c and d2a>d2b>d2c can be established.

FIG. 24 shows graphs of a longitudinal spherical aberration, an astigmatic field curve, and a distortion of the optical system which are measured on light having wavelengths of 435 nm, 486 nm, 546 nm, 587 nm, and 656 nm at an infinity focus according to the first embodiment. FIG. 25 shows graphs of a longitudinal spherical aberration, an astigmatic field curve, and a distortion of the optical system which are measured on light having wavelengths of 435 nm, 486 nm, 546 nm, 587 nm, and 656 nm at an intermediate focus according to the first embodiment. FIG. 26 shows graphs of a longitudinal spherical aberration, an astigmatic field curve, and a distortion of the optical system which are measured on light having wavelengths of 435 nm, 486 nm, 546 nm, 587 nm, and 656 nm at a nearest focus according to the first embodiment.

The longitudinal spherical aberration represents a longitudinal spherical aberration according to each wavelength, the astigmatic field curve represents the aberration characteristics of a tangential plane and a sagital plane according to a height of an image plane, and the distortion represents a degree of distortion according to the height of the image plane. Referring to FIGS. 24 to 26, it can be seen that the longitudinal spherical aberration is within a range of −0.05 mm to 0.05 mm irrespective of wavelengths, it can be seen that the astigmatic field curve is within a range of −0.25 mm to 0.25 mm irrespective of wavelengths, and it can be seen that the distortion is within a range of 0 mm to 1 mm irrespective of wavelength.

FIG. 27 illustrates an optical system according to a second embodiment of the present invention.

Referring to FIG. 27, the optical system according to the embodiment of the present invention includes a first lens group 3100, a second lens group 3200, and a filter 3300 sequentially arranged in a direction from an object toward an image. Here, the lens groups may correspond to the lens groups described above with reference to FIGS. 1 to 19.

According to an embodiment of the present invention, the first lens group 3100 includes one lens. The first lens group 3100 is fixed with respect to an image side. That is, the one lens may be fixed with respect to the image side. In this case, the first lens group 3100 may include one or more lenses. When the first lens group 3100 includes two or more lenses, an overall size of the optical system may increase. According to an embodiment, the first lens group 3100 may include one lens. The first lens group 3100 may include a first lens. The first lens group 3100 may have positive refractive power.

The second lens group 3200 includes a plurality of lenses. The second lens group 3200 may include four or more lenses. When the second lens group 3200 includes six or more lenses, a size and weight of the second lens group 3200 may increase, and driving power may increase during movement. According to an embodiment, the second lens group 3200 may include five lenses. The second lens group 3200 may include a second lens 3210, a third lens 3220, a fourth lens 3230, a fifth lens 3240, and a sixth lens 3250.

The second lens group 3200 may move in a direction parallel to an optical axis. That is, the plurality of lenses may move along a central axis of the lenses. A focus may be adjusted according to movement of the second lens group 3200. Accordingly, the second lens group 3200 may serve as a focusing group.

The second lens group 3200 may move from an infinity focus to a nearest focus. When the second lens group 3200 moves from the infinity focus to the nearest focus, a distance between the first lens group 3100 and a second lens group 3200 may increase. The second lens group 3200 may move from the nearest focus to the infinity focus. When the second lens group 3200 moves from the nearest focus to the infinity focus, the distance between the first lens group 3100 and the second lens group 3200 may decrease.

The optical system according to the embodiment of the present invention may be a fixed zoom optical system of which a focus is adjusted according to the movement of the second lens group 3200. Accordingly, a magnification of the optical system may not increase or decrease according to the movement of the second lens group 3200.

According to an embodiment of the present invention, a movement stroke of the second lens group 3200 may be less than 0.0104 mm. Here, the movement stroke may be a distance by which the lens group may be moved by a driving unit. Thus, the second lens group 3200 may move within 0.0104 mm when moving from the infinity focus to the nearest focus. Since the movement stroke of the second lens group 3200 is implemented within 0.0104 mm, the driving unit for driving the second lens group 3200 can be miniaturized. Accordingly, it is possible to miniaturize a camera module, and it is advantageous for the camera module to be mounted on a small electronic device such as a portable terminal. The second lens group 3200 may have negative refractive power.

The optical system may include one filter 3300. The filter 3300 may be fixed apart from a surface of a sensor by a certain interval. In an embodiment of the present invention, the filter 3300 may be referred to as a third lens group. The filter 3300 may include an IR filter. Accordingly, the filter 3300 may block near-infrared rays, for example, light having a wavelength of 700 nm to 1100 nm, from light entering the camera module. The image sensor 3400 may be connected to a printed circuit board through a wire. Alternatively, the filter 3300 may include a foreign material prevention filter and the IR filter sequentially arranged in the direction from the object toward the image. When the filter 3300 includes the foreign material prevention filter, foreign materials generated while the second lens group 3200 moves may be prevented from being introduced into the IR filter or an image sensor 3400.

The first lens group 3100, the second lens group 3200, and the filter 3300 may move in a direction perpendicular to the optical axis. The first lens group 3100, the second lens group 3200, and the filter 3300 may move in a direction parallel to a surface of the image sensor 3400. The first lens group 3100, the second lens group 3200, and the filter 3300 may move integrally when moving in the direction perpendicular to the optical axis. The first lens group 3100, the second lens group 3200, and the filter 3300 may implement an OIS while moving in the direction perpendicular to the optical axis.

According to an embodiment of the present invention, the optical system may have a TTL that is less than 7 mm. Here, The TTL may be a distance from the surface of the image sensor to a first surface of the optical system. For example, the TTL may be a distance from a surface of the first lens group 3100 closest to the object to an upper surface of the image sensor 3400 on which light is incident. In the present specification, the TTL may be used interchangeably with a full-length distance. In the optical system according to the embodiment of the present invention, the TTL is fixed because, while the second lens group 3200 disposed between the first lens group 3100 and the image sensor 3400 is moved in an optical axis direction, a focus is adjusted. According to an embodiment, in the optical system, the TTL may be fixed within 7 mm.

According to an embodiment of the present invention, the plurality of lenses included in the first lens group 3100 and the second lens group 3200 may be lenses to which a D-cut technique is applied. The plurality of lenses included in the first lens group 3100 and the second lens group 3200 may be D-cut lenses in which portions of upper and lower portions are cut. In this case, in the upper and lower portions of the plurality of lenses, ribs and portions of effective diameters may be cut, or only the ribs may be cut without the effective diameter being cut. According to an embodiment, the second lens group 3200 may include a lens in which a value obtained by dividing a major axis length of an effective diameter by a minor axis length of the effective diameter is 1. That is, the major axis length of the effective diameter may be the same as the minor axis length of the effective diameter. For example, in the case of the third lens 3210, the fourth lens 3220, and the fourth lens 3230, only rubs of upper and lower portions may be cut, and effective diameters thereof may not be cut. In the case of a circular type lens, there is a problem in that a volume of the lens is increased due to a height in a vertical direction, but as in the embodiment of the present invention, by applying a D-cut to the upper and lower portions of the plurality of lenses, a height in the vertical direction can be decreased, thereby reducing a volume of the lens.

Hereinafter, examples of various embodiments of the present invention will be described in more detail.

FIG. 28 is a cross-sectional view of the optical system at an infinity focus according to the second embodiment of the present invention. FIG. 29 is a cross-sectional view of the optical system at a nearest focus according to the second embodiment of the present invention.

Referring to FIGS. 28 and 29, the optical system includes the first lens group 3100 and the second lens group 3200 sequentially arranged in a direction from an object toward an image. The first lens group 3100 includes a first lens 3110 arranged in the direction from the object toward the image, and the second lens group 3200 includes the second lens 3210, the third lens 3220, the fourth lens 3230, the fifth lens 3240, and the sixth lens 3250 sequentially arranged in the direction from the object toward the image.

Here, the first lens 3110 may include a convex object side surface 3112 and a convex image side surface 3114.

The second lens 3210 may include a concave object side surface 3212 and a concave image side surface 3214. The third lens 3220 may include a convex object side surface 3222 and a concave image side surface 3224. The fourth lens 3230 may include a concave object side surface 3232 and a convex image side surface 3234. The fifth lens 3240 may include a concave object side surface 3242 and a concave image side surface 3244. The sixth lens 3250 may include a convex object side surface 3252 and a convex image side surface 3254.

In FIG. 28, when a distance between the first lens group 3100 and the second lens group 3200 is d1a and a distance between the second lens group 3200 and the image sensor is d2a, the optical system may have an infinity focus. In FIG. 29, when the distance between the first lens group 3100 and the second lens group 3200 is d1b and the distance between the second lens group 3200 and the image sensor is d2b, the optical system may have a nearest focus. For example, the optical system may have a focus at a distance of 1 m.

In the optical system, when the second lens group 3200 moves from a position of FIG. 28 to a position of FIG. 29, the distance between the first lens group 3100 and the second lens group 3200 increases, and the distance between the second lens group 3200 and the image sensor decreases. Therefore, a relationship of d1a<d2b and d2a>d2b can be established.

FIG. 30 shows graphs of a longitudinal spherical aberration, an astigmatic field curve, and a distortion of the optical system which are measured on light having wavelengths of 435 nm, 486 nm, 546 nm, 587 nm, and 656 nm at an infinity focus according to the second embodiment. FIG. 31 shows graphs of a longitudinal spherical aberration, an astigmatic field curve, and a distortion of the optical system which are measured on light having wavelengths of 435 nm, 486 nm, 546 nm, 587 nm, and 656 nm at a nearest focus according to the second embodiment.

The longitudinal spherical aberration represents a longitudinal spherical aberration according to each wavelength, the astigmatic field curve represents the aberration characteristics of a tangential plane and a sagital plane according to a height of an image plane, and the distortion represents a degree of distortion according to the height of the image plane. Referring to FIGS. 30 and 31, it can be seen that the longitudinal spherical aberration is within a range of −0.04 mm to 0.08 mm irrespective of wavelength, it can be seen that the astigmatic field curve is within a range of −0.25 mm to 0.25 mm irrespective of wavelengths, and it can be seen that the distortion is within a range of −0.2 mm to 2 mm irrespective of wavelength.

Hereinafter, a configuration of a camera module 4000 according to embodiments of the present invention will be described with reference to FIGS. 32 and 33. The camera module described below may correspond to the camera module described above with reference to FIGS. 1 to 19.

FIG. 32 is a schematic view illustrating a camera module according to an embodiment of the present invention. FIG. 33 is a schematic view illustrating a camera module according to another embodiment of the present invention.

Referring to FIGS. 32 and 33, a camera module 4000 according to embodiments of the present invention may include a board 4100, a sensor 4200, a housing 4300, a first lens assembly 4400, a second lens assembly 4500, and a driving unit 4600. The camera module 4000 may include a plurality of balls 4700 and a cover 4800. The plurality of balls 4700 may include first balls 4710 and second balls 4720.

The sensor 4200 may be disposed on the board 4100. The board 4100 may be structurally coupled to the sensor 4200. The housing 4300 may be disposed on the board 4100. The board 4100 may be structurally coupled to the housing 4300. The cover 4800 may be disposed on the board 4100. The board 4100 may be structurally coupled to the cover 4800.

A circuit pattern may be disposed on the board 4100. Accordingly, the board 4100 may be a printed circuit board 4100. The board 4100 may be a flexible PCB (F-PCB), a PCB, or a board 4100 in which a circuit is connectable. The circuit pattern disposed on the board 4100 may electrically connect an external power supply for driving the sensor 4200 to the sensor 4200. The circuit pattern disposed on the board 4100 may electrically connect the driving unit 4600 and a control element for controlling the driving unit 4600. In addition to the above example, the circuit pattern disposed on the board 4100 may electrically connect various elements of the camera module 4000.

The sensor 4200 may be an image sensor. The sensor 4200 may be disposed on the board 4100. The sensor 4200 may be disposed on an optical axis of the first lens assembly 4400 and the second lens assembly 4500. The sensor 4200 may perform a function of converting light, which passes through the first lens assembly 4400 and the second lens assembly 4500, into image data.

The housing 4300 may be disposed on the board 4100. The housing 4300 may include an internal space.

The housing 4300 may include a body part 4310, a moving part 4320, and a fixed part 4330.

The body part 4310 may be coupled to the first lens assembly 4400. The body part 4310 may move in a direction perpendicular to the optical axis. The body part 4310 may move in a direction parallel to an upper surface of the sensor 4200.

The moving part 4320 may be coupled to the second lens assembly 4500. The moving part 4320 may be coupled to a second holder of the second lens assembly 4500. The moving part 4320 may be coupled to the second lens assembly 4500 to move integrally with the second lens assembly 4500. The moving part 4320 may move in an optical axis direction. Accordingly, the moving part 4320 may move the second lens assembly 4500 in the optical axis direction.

The moving part 4320 may be coupled to the body part 4310. The first ball 4710 may be disposed between the moving part 4320 and the body part 4310. The first ball 4710 may support the moving part 4320 to be movable in the optical axis direction. The plurality of first balls 4710 may be provided. The first ball 4710 may be rotatably accommodated in the moving part 4320. In this case, the moving part 4320 may include a groove for accommodating the first ball 4710. In another embodiment, the first ball 4710 may be movably accommodated in the body part 4310. In this case, the body part 4310 may include a groove for accommodating the first ball 4710. The groove included in the moving part 4320 or the body part 4310 may be formed to accommodate one first ball 4710, but the present invention is not limited thereto. The ball may have a spherical shape.

The fixed part 4330 may be fixedly disposed on an upper surface of the board 4100. The fixed part 4330 may be coupled to the body part 4310. The fixed part 4330 may include a support surface for supporting the body part 4310. The support surface may be a surface perpendicular to the optical axis. The support surface may be a surface parallel to the upper surface (or lower surface) of the board 4100. The body part 4310 may be disposed on the support surface of the fixed part 4330. The second ball 4720 may be disposed between the fixed part 4330 and the body part 4310. The second ball 4720 may support the body part 4310 to be movable in the direction perpendicular to the optical axis. That is, the second ball 4720 may support the body part 4310 to be movable along the support surface of the fixed part 4330. The plurality of second balls 4720 may be provided. The second ball 4720 may be rotatably accommodated in the fixed part 4330. In this case, the fixed part 4330 may include a groove for accommodating the second ball 4720. As another embodiment, the second ball 4720 may be movably accommodated in the body part 4310. In this case, the body part 4310 may include a groove for accommodating the second ball 4720. The groove included in the fixed part 4330 or the body part 4310 may be formed to accommodate one second ball 4720, but the present invention is not limited thereto. The ball may have a spherical shape.

The first lens assembly 4400 may include a lens and a first holder for accommodating the lens. The second lens assembly 4500 may include a lens and the second holder for accommodating the lens. The first lens assembly 4400 and the second lens assembly 4500 may correspond to the first lens group and the second lens group described above with reference to the drawings. Detailed descriptions thereof will be omitted.

The driving unit 4600 may move the second lens assembly 4500 in the optical axis direction. The driving unit 4600 may move the moving part 4320 included in the housing 4300 in the optical axis direction. The driving unit 4600 may move the second lens assembly 4500 by moving the moving part 4320 included in the housing 4300 in the optical axis direction.

The driving unit 4600 may move the housing 4300 in the direction perpendicular to the optical axis. The driving unit 4600 may move the body part 4310 included in the housing 4300 in the direction perpendicular to the optical axis. The driving unit 4600 may move the first lens assembly 4400 and the second lens assembly 4500 by moving the body part 4310 included in the housing 4300 in the direction perpendicular to the optical axis.

The driving unit 4600 may include a magnet 4610, a first coil 4620, and a second coil 4630.

The magnet 4610 may be coupled to the housing 4300. The magnet 4610 may be disposed in the housing 4300. The magnet 4610 may be disposed on the body part 4310 of the housing 4300. The magnet 4610 may be coupled to the housing 4300 to move integrally with the housing 4300. The magnet 4610 may be coupled to the body part 4310 of the housing 4300 to move integrally with the body part 4310. The magnet 4610 may be disposed to face the first coil 4620. The magnet 4610 may face the first coil 4620. The magnet 4610 may be disposed apart from the first coil 4620. The magnet 4610 may be disposed to face the second coil 4630. The magnet 4610 may face the second coil 4630. The magnet 4610 may be disposed apart from the second coil 4630.

One or more magnets 4610 may be provided. According to an embodiment, as shown in FIG. 33, one magnet 4610 may be provided. The one magnet 4610 may be disposed to face the corresponding first and second coils 4620 and 4630. In this case, one first coil 4620 and one second coil 4630 may be provided. According to another embodiment, as shown in FIG. 32, two magnets 4610 may be provided. The two magnets 4610 may be disposed to face each other with respect to the optical axis. In this case, two first coils 4620 may be provided, and two second coils 4630 may be provided. One first coil 4620 and one second coil 4630 may be disposed to correspond to one magnet 4610. In addition, three or more magnets 4610 may be provided.

The magnet 4610 may be fixed to the housing 4300 through an adhesive. In addition, the magnet 4610 may be coupled to the housing 4300 through various fixing methods.

The first coil 4620 may be coupled to at least one side of the second lens assembly 4500. The first coil 4620 may be disposed on an outer surface of the second lens assembly 4500. The first coil 4620 may be disposed on the second holder included in the second lens assembly 4500. The first coil 4620 may be disposed on an outer surface of the second holder included in the second lens assembly 4500. The first coil 4620 may be disposed to face the magnet 4610. The first coil 4620 may be disposed on the second lens assembly 4500 to face the magnet 4610.

The first coil 4620 may be formed as a pattern coil on the outer surface of the second lens assembly 4500. The first coil 4620 may be a fine pattern coil formed integrally with the outer surface of the second lens assembly 4500. When a current is applied to the first coil 4620, the first coil 4620 may electromagnetically interact with the magnet 4610. According to an embodiment, when a current is applied to the first coil 4620, the second lens assembly 4500 coupled to the first coil 4620 may move away from the sensor 4200 in the optical axis direction. That is, the camera module 4000 may implement an AF function by applying a current to the first coil 4620. The first coil 4620 may perform a function of an AF coil.

One or more first coils 4620 may be provided. According to an embodiment, as shown in FIG. 33, one first coil 4620 may be provided. The one coil may be disposed on the outer surface of the second lens assembly 4500. According to another embodiment, as shown in FIG. 32, two first coils 4620 may be provided. The two first coils 4620 may be disposed to face each other with respect to the optical axis. In addition, three or more first coils 4620 may be provided.

The second coil 4630 may be coupled to at least one side of the housing 4300. The second coil 4630 may be disposed on the fixed part 4330 of the housing 4300. The second coil 4630 may be disposed to face the magnet 4610. The second coil 4630 may be disposed on the fixed part 4330 of the housing 4300 to face the magnet 4610.

The second coil 4630 may be formed as a pattern coil on the fixed part 4330 of the housing 4300. The second coil 4630 may be a fine pattern coil formed integrally with the fixed part 4330 of the housing 4300. When a current is applied to the second coil 4630, the second coil 4630 may electromagnetically interact with the magnet 4610. According to an embodiment, when a current is applied to the second coil 4630, the magnet 4610 electromagnetically interacting with the second coil 4630 may move. Since the magnet 4610 is coupled to the body part 4310 of the housing 4300, the body part 4310 of the housing 4300 may be moved through an electromagnetic interaction between the second coil 4630 and the magnet 4610. Since the body part 4310 of the housing 4300 is coupled to the first lens assembly 4400 and coupled to the second lens assembly 4500 through the moving part 4320, an electromagnetic interaction between the second coil 4630 and the magnet 4610 may move the first lens assembly 4400 and the second lens assembly 4500 in the direction perpendicular to the optical axis. Thus, the camera module 4000 may perform an OIS function (hand shake correcting function). The second coil 4630 may perform a function of an OIS coil.

One or more second coils 4630 may be provided. According to an embodiment, as shown in FIG. 33, one second coil 4630 may be provided. The one second coil 4630 may be disposed on the fixed part 4330 of the housing 4300. According to another embodiment, as shown in FIG. 32, two first coils 4620 may be provided. The two second coils 4630 may be disposed on the fixed part 4330 of the housing 4300 to face each other with respect to the optical axis. In addition, three or more second coils 4630 may be provided.

The cover 4800 may be disposed on the housing 4300. The cover 4800 may have an opening such that a portion of the housing 4300 to which the lens assembly is coupled is exposed. The opening of the cover 4800 may be provided apart from a portion of the housing 4300. For example, a diameter of the opening may be greater than a diameter of a portion of the housing 4300 exposed through the opening. This is to provide a space in which the housing 4300 moves in the direction perpendicular to the optical axis.

The cover 4800 may include a metal material. The cover 4800 may be formed as a ferrite plate. The cover 4800 may prevent internal electromagnetic waves from being emitted to the outside or may prevent external electromagnetic waves from being introduced therein.

Accordingly, the cover 4800 is referred to as a "shield can" and may perform an electromagnetic wave shielding function. However, the material of the cover 4800 is not limited thereto. The cover 4800 may include a plastic material. In this case, the cover 4800 may not perform an electromagnetic wave shielding function.

FIG. 34 shows views for describing an operation of a driving unit according to an embodiment of the present invention.

Referring to FIG. 34, a camera module 4000 according to the embodiment of the present invention may include a board 4100, a sensor 4200, a first lens assembly 4400, and a second lens assembly 4500.

As shown FIG. 34A, a driving unit 4600 may move the second lens assembly 4500 in an optical axis direction through an electromagnetic interaction between a first coil 4620 and a magnet 4610. Thus, the camera module 4000 may perform an AF function. Even when the second lens assembly 4500 is moved in the optical axis direction as the AF function is performed, the first lens assembly 4400 is not moved in the optical axis direction. The first lens assembly 4400 is fixed at a certain distance from the sensor 4200 (and the board 4100). When the AF function is performed, since the first lens assembly 4400 is fixed, a TTL of the camera module 4000 may be fixed. Meanwhile, a collision prevention member may be disposed between the first lens assembly 4400 and the second lens assembly 4500. The collision prevention member may prevent a lens from being damaged by the second lens assembly 4500 colliding with the first lens assembly 4400 while moving in the optical axis direction when the AF function is performed. Other than that the AF function is performed, the collision prevention member may prevent the lens from being damaged by the first lens assembly 4400 and the second lens assembly 4500 colliding with each other due to an external impact.

As shown in FIG. 34B, the driving unit 4600 may move a body part 4310 of a housing 4300 in a direction perpendicular to an optical axis through an electromagnetic interaction between a second coil 4630 and a magnet 4610. Since the first lens assembly 4400 and the second lens assembly 4500 are coupled to the body part 4310, the electromagnetic interaction between the second coil 4630 and the magnet 4610 may integrally move the first lens assembly 4400 and the second lens assembly 4500 in the direction perpendicular to the optical axis. Thus, the camera module 4000 may perform an OIS function.

FIG. 35 shows views for describing an operation of a driving unit according to another embodiment of the present invention.

Referring to FIG. 35, a camera module 4000 according to the embodiment of the present invention may include a board 4100, a sensor 4200, a first lens assembly 4400, a second lens assembly 4500, and a third lens assembly 4550. Here, the third lens assembly 4550 may be a filter.

As shown FIG. 35A, a driving unit 4600 may move the second lens assembly 4500 in an optical axis direction through an electromagnetic interaction between a first coil 4620 and a magnet 4610. Thus, the camera module 4000 may perform an AF function. Even when the second lens assembly 4500 is moved in the optical axis direction as the AF function is performed, the first lens assembly 4400 and the third lens assembly 4550 are not moved in the optical axis direction. The first lens assembly 4400 and the third lens assembly 4550 are fixed at a certain distance from the sensor 4200 (and the board 4100). When the AF function is performed, since the first lens assembly 4400 is fixed, a TTL of the camera module 4000 may be fixed. Meanwhile, a collision prevention member may be disposed between the first lens assembly 4400 and the second lens assembly 4500 and between the second lens assembly 4500 and the third lens assembly 4550. The collision prevention member may prevent a lens from being damaged by the second lens assembly 4500 colliding with the first lens assembly 4400 and the third lens assembly 4550 while moving in the optical axis direction when the AF function is performed. Other than that the AF function is performed, the collision prevention member may prevent the lens from being damaged by the first lens assembly 4400 and the second lens assembly 4500 colliding with each other due to an external impact and the second lens assembly 4500 and the third lens assembly 4550 colliding with each other due to an external impact.

As shown in FIG. 35B, the driving unit 4600 may move a body part 4310 of a housing 4300 in a direction perpendicular to an optical axis through an electromagnetic interaction between a second coil 4630 and the magnet 4610. Since the first lens assembly 4400, the second lens assembly 4500, and the third lens assembly 4550 are coupled to the body part 4310, the electromagnetic interaction between the second coil 4630 and the magnet 4610 may integrally move the first lens assembly 4400, the second lens assembly 4500, and the third lens assembly 4550 in the direction perpendicular to the optical axis. Thus, the camera module 4000 may perform an OIS function.

FIG. 36 shows views for describing a structure of a housing according to an embodiment of the present invention. FIG. 37 shows views for describing a structure of a housing according to another embodiment of the present invention.

A housing 4300 shown in FIGS. 36 and 37 may be a body part 4310 of the housing 4300. According to an embodiment, as shown in FIG. 36, the body part 4310 of the housing 4300 may be integrally formed. The integrally formed body part 4310 of the housing 4300 may be coupled to a moving part 4320 coupled to a first lens assembly 4400 and a second lens assembly 4500. The second lens assembly 4500 may move in an optical axis in an accommodating space inside the integrally formed body part 4310 of the housing 4300 through a driving unit 4600.

According to another embodiment, as shown in FIG. 37, the body part 4310 of the housing 4300 may include a first body part 4311 and a second body part 4312. The first body part 4311 may be coupled to the first lens assembly 4400. The second body part 4312 may be coupled to the moving part 4320 coupled to the second lens assembly 4500. The second lens assembly 4500 may move in the optical axis in the accommodating space inside the second body part 4312 through the driving unit 4600. The first body part 4311 and the second body part 4312 may be provided separately. The first body part 4311 and the second body part 4310 may be formed to be structurally coupled. A collision prevention member for preventing collision between the first lens assembly 4400 and the second lens assembly 4500 may be formed integrally with a portion of the second body part 4312 coupled to the first body part 4311.

The present invention has been described based on embodiments, but the embodiments are for illustrative and do not limit the present invention, and those skilled in the art will appreciate that various modifications and applications, which are which are not exemplified in the above description, may be made without departing from the scope of the essential characteristic of the present embodiments. For example, each component described in detail in the embodiment can be modified. Further, the differences related to the modification and the application should be construed as being included in the scope of the present invention defined in the appended claims.

The invention claimed is:

1. A camera device comprising:
   a base;
   a first lens assembly disposed in the base, the first lens assembly including a first lens group and a first lens support unit to which the first lens group is fixed;
   a second lens assembly disposed in the base, the second lens assembly including a second lens group and a second lens support unit to which the second lens group is fixed;
   a driving unit configured to drive the second lens assembly;
   a first stopper member located on an inner wall of the second lens support unit; and
   a second stopper member located on the inner wall of the second lens support, the second stopper member being spaced apart from the first stopper member by an interval greater than a height of the first lens assembly in a moving direction of the second lens support unit, wherein the first lens assembly is accommodated between the first stopper member and the second stopper member in the second lens support unit, and wherein the second lens assembly is configured to be moved together with the first lens assembly in the base, and wherein the first lens assembly is configured to move in a first direction together with the second lens assembly in a state of being caught by the second stopper member or is configured to move in a second direction together with the second lens assembly in a state of being caught by the first stopper member.

2. The camera device of claim 1, wherein the driving unit includes:
  a coil driving unit disposed on at least one of a first inner wall and a second inner wall, which faces the first inner wall, of the base; and
  a magnet driving unit disposed on the second lens support unit to face the coil driving unit, and
  wherein the second lens assembly is configured to be moved along the first inner wall and the second inner wall by an interaction between the coil driving unit and the magnet driving unit.

3. The camera device of claim 2, further comprising:
  a magnet disposed on the first lens assembly; and
  a first yoke and a second yoke fixed at a certain interval on one surface of the base disposed to face the magnet,
  wherein, according to a position of the second lens assembly, an attractive force acts between the magnet and the first yoke, or an attractive force acts between the magnet and the second yoke.

4. The camera device of claim 3, further comprising:
  a first zooming mode, wherein the attractive force acts between the first yoke and the magnet, such that the first lens assembly moves together with the second lens assembly in a first direction, and
  a second zooming mode, wherein the attractive force acts between the second yoke and the magnet, such that the first lens assembly moves together with the second lens assembly in a second direction opposite to the first direction.

5. The camera device of claim 4, wherein by the attractive force acting between the magnet and the first yoke, the first lens assembly is further moved in the first direction until the first lens assembly comes into contact with the first stopper member, and
  wherein by the attractive force acting between the magnet and the second yoke, the first lens assembly is further moved in the second direction until the first lens assembly comes into contact with the second stopper member.

6. The camera device of claim 5, wherein the second lens assembly is configured to perform focusing in a state in which the first lens assembly is in contact with the first stopper member or in a state in which the first lens assembly is in contact with the second stopper member.

7. The camera device of claim 1, further comprising:
  a guide part disposed adjacent to at least one of a first inner wall and a second inner wall of the base;
  a groove corresponding to the guide part is located in an outer circumferential surface of the second lens support unit; and
  a ball is disposed between the guide part and the groove.

8. The camera device of claim 1, further comprising a guide pin fixed to the base to be parallel to an optical axis, wherein the second lens support unit moves along the guide pin.

9. The camera device of claim 1, further comprising a first lens group and a second lens group sequentially arranged in a direction from an object toward an image,
  wherein each of the first lens group and the second lens group includes one or more lenses,
  wherein the first lens group is fixed with respect to an image side,
  wherein the second lens group is movable in an optical axis direction, and
  wherein when the second lens group moves from an infinity focus to a nearest focus, a separation distance between the first lens group and the second lens group increases.

10. The camera device of claim 9, wherein the first lens group has positive refractive power, and
  wherein the second lens group has negative refractive power.

11. The camera device of claim 10, wherein a total track length (TTL) is fixed within 7 mm.

12. The camera device of claim 11, wherein when focusing is performed from the infinity focus to the nearest focus, a movement stroke of the second lens group is within 0.02 mm.

13. The camera device of claim 11, wherein the first lens group has an effective focal length (EFL) in the range greater than 8 mm and less than 9 mm.

14. The camera device of claim 11, wherein the second lens group has an effective focal length (EFL) in the range greater than-12 mm and less than-11 mm.

15. The camera device of claim 11, wherein the first lens group includes a first lens and a second lens sequentially arranged from the object side to the image side.

16. The camera device of claim 15, wherein the second lens group includes a third lens and a fourth lens sequentially arranged from the object side to the image side.

17. The camera device of claim 16, wherein at least one of the first to fourth lenses is a D-cut lens.

18. The camera device of claim 11, wherein the first lens group is movable in a direction perpendicular to the optical axis.

19. The camera device of claim 11, wherein the second lens group is movable in a direction perpendicular to the optical axis.

20. A camera module comprising:
  a board;
  a sensor disposed on the board;
  a housing which is disposed on the board and includes an internal space;
  a first lens assembly including at least one lens, the first lens assembly being coupled to the housing;
  a second lens assembly including at least one lens, the second lens assembly being accommodated in the internal space and coupled to the housing; and
  a driving unit configured to move the second lens assembly in an optical axis direction and to move the housing in a direction perpendicular to the optical axis,
  wherein the driving unit includes:
  a magnet coupled to the housing;
  a first coil disposed to face the magnet and coupled to at least one side of the second lens assembly; and
  a second coil disposed to face the magnet and coupled to one side of the housing,
  wherein the first lens assembly is configured to move in a first direction together with the second lens assembly in a state of being caught by a second stopper member or to move in a second direction together with the second lens assembly in a state of being caught by a first stopper member.

\* \* \* \* \*